(12) United States Patent
Jung et al.

(10) Patent No.: US 11,920,723 B2
(45) Date of Patent: Mar. 5, 2024

(54) VACUUM ADIABATIC BODY AND REFRIGERATOR

(71) Applicant: LG ELECTRONICS INC., Seoul (KR)

(72) Inventors: Wonyeong Jung, Seoul (KR); Deokhyun Youn, Seoul (KR); Daewoong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/030,806

(22) Filed: Sep. 24, 2020

(65) Prior Publication Data

US 2021/0062956 A1 Mar. 4, 2021

Related U.S. Application Data

(62) Division of application No. 15/749,162, filed as application No. PCT/KR2016/008466 on Aug. 1, 2016, now Pat. No. 10,816,129.

(30) Foreign Application Priority Data

Aug. 3, 2015 (KR) .................... 10-2015-0109728

(51) Int. Cl.
*F16L 59/065* (2006.01)
*F25D 19/00* (2006.01)
(Continued)

(52) U.S. Cl.
CPC .......... *F16L 59/065* (2013.01); *F25D 19/006* (2013.01); *F25D 23/028* (2013.01);
(Continued)

(58) Field of Classification Search
CPC .... F25D 19/006; F25D 23/028; F25D 23/062; F25D 23/063; F25D 23/085;
(Continued)

(56) References Cited

U.S. PATENT DOCUMENTS 1,413,169 A 4/1922 Lawton
1,588,707 A 6/1926 Csiga
(Continued)

FOREIGN PATENT DOCUMENTS

CN 1132346 10/1996
CN 1191959 9/1998
(Continued)

OTHER PUBLICATIONS

Machine translation of EP 0658716 (Year: 1995).*
(Continued)

*Primary Examiner* — Joseph F Trpisovsky
(74) *Attorney, Agent, or Firm* — KED & ASSOCIATES, LLP

(57) ABSTRACT

A vacuum adiabatic body includes: a first plate member; a second plate member; a sealing part sealing the first plate member and the second plate member to provide a third space in a vacuum state; a supporting unit; a heat resistance unit for decreasing a heat transfer amount between the first plate member and the second plate member; and an exhaust port through which a gas in the third space is exhausted. The heat resistance unit includes a conductive resistance sheet capable of resisting heat conduction flowing along a wall for the third space, and a side frame fastened to the conductive resistance sheet to define at least one portion of the wall for the third space. Accordingly, a vacuum adiabatic body may be capable of resisting heat conduction.

24 Claims, 8 Drawing Sheets

(51) Int. Cl.
*F25D 23/02* (2006.01)
*F25D 23/06* (2006.01)
*F25D 23/08* (2006.01)

(52) U.S. Cl.
CPC ......... *F25D 23/062* (2013.01); *F25D 23/063* (2013.01); *F25D 23/087* (2013.01); *F25D 23/085* (2013.01); *F25D 2201/14* (2013.01); *Y02B 40/00* (2013.01)

(58) Field of Classification Search
CPC .. F25D 23/087; F25D 2201/14; F16L 59/065; Y02B 40/00
See application file for complete search history.

(56) References Cited

U.S. PATENT DOCUMENTS

| | | |
|---|---|---|
| 1,845,353 A | 2/1932 | Snell |
| 2,000,882 A | 5/1935 | Comstock |
| 2,708,774 A | 5/1955 | Seelen |
| 2,715,976 A | 8/1955 | Whitmore |
| 2,729,863 A | 1/1956 | Kurtz |
| 2,768,046 A | 10/1956 | Evans |
| 2,786,241 A | 3/1957 | Garvey et al. |
| 3,091,946 A | 6/1963 | Kesling |
| 3,161,265 A | 12/1964 | Matsch et al. |
| 3,289,423 A | 12/1966 | Berner et al. |
| 3,370,740 A | 2/1968 | Anderson |
| 4,056,211 A | 11/1977 | Zumwalt |
| 4,646,934 A | 3/1987 | McAllister |
| 4,822,117 A | 4/1989 | Boston, Jr. |
| 4,959,111 A | 9/1990 | Kruck et al. |
| 5,011,729 A | 4/1991 | McAllister |
| 5,018,328 A | 5/1991 | Cur |
| 5,033,803 A | 7/1991 | Katsuyoshi et al. |
| 5,185,981 A | 2/1993 | Martinez |
| 5,200,015 A | 4/1993 | Schilf |
| 5,361,598 A | 11/1994 | Roseen |
| 5,512,345 A | 4/1996 | Tsutsumi et al. |
| 5,532,034 A | 7/1996 | Kirby et al. |
| 5,694,789 A | 12/1997 | Do |
| 5,795,639 A | 8/1998 | Lin |
| 5,843,353 A | 12/1998 | De Vos et al. |
| 5,947,479 A | 9/1999 | Ostrowski |
| 6,001,890 A | 12/1999 | Hamilton |
| 6,029,846 A | 2/2000 | Hirath et al. |
| 6,038,830 A | 3/2000 | Hirath et al. |
| 6,109,712 A | 8/2000 | Haworth et al. |
| 6,168,040 B1 | 1/2001 | Sautner et al. |
| 6,192,703 B1 | 2/2001 | Salyer et al. |
| 6,244,458 B1 | 6/2001 | Frysinger et al. |
| 6,338,536 B1 | 1/2002 | Ueno et al. |
| 6,485,122 B2 | 11/2002 | Wolf |
| 8,383,225 B2 | 2/2013 | Rotter |
| 8,857,931 B2 | 10/2014 | Jung et al. |
| 8,881,398 B2 | 11/2014 | Hanley et al. |
| 8,943,770 B2 | 2/2015 | Sanders |
| 8,944,541 B2 | 2/2015 | Allard et al. |
| 9,182,158 B2 | 11/2015 | Wu |
| 9,328,951 B2 | 5/2016 | Shin |
| 9,441,779 B1 | 9/2016 | Alshourbagy et al. |
| 9,463,918 B2 | 10/2016 | Reid |
| 9,752,818 B2 | 9/2017 | Naik |
| 9,791,204 B2 | 10/2017 | Kim |
| 9,945,600 B2 | 4/2018 | Kang |
| 10,082,328 B2 | 9/2018 | Jung et al. |
| 2002/0041134 A1 | 4/2002 | Wolf et al. |
| 2002/0100250 A1 | 8/2002 | Hirath et al. |
| 2002/0170265 A1 | 11/2002 | Tokonabe et al. |
| 2003/0080126 A1 | 5/2003 | Voute et al. |
| 2003/0115838 A1 | 6/2003 | Rouanet et al. |
| 2003/0207075 A1 | 11/2003 | Maignan et al. |
| 2004/0051427 A1 | 3/2004 | Cittadini et al. |
| 2004/0091688 A1 | 5/2004 | Gaku |
| 2004/0226956 A1 | 11/2004 | Brooks |
| 2005/0175809 A1 | 8/2005 | Hirai et al. |
| 2005/0235682 A1 | 10/2005 | Hirai et al. |
| 2007/0152551 A1 | 7/2007 | Kim et al. |
| 2007/0204648 A1 | 9/2007 | Smale et al. |
| 2007/0243358 A1 | 10/2007 | Gandini |
| 2008/0110128 A1 | 5/2008 | Hirath |
| 2008/0289898 A1 | 11/2008 | Rickards |
| 2009/0031659 A1 | 2/2009 | Kalfon |
| 2009/0113899 A1 | 5/2009 | Dain et al. |
| 2010/0104923 A1 | 4/2010 | Takeguchi et al. |
| 2010/0178439 A1 | 7/2010 | Bettger et al. |
| 2010/0283359 A1 | 11/2010 | Hottmann |
| 2011/0089802 A1 | 4/2011 | Cording |
| 2011/0146333 A1 | 6/2011 | Koo et al. |
| 2011/0241513 A1 | 10/2011 | Nomura |
| 2011/0296797 A1 | 12/2011 | Stark et al. |
| 2012/0103006 A1 | 5/2012 | Jung |
| 2012/0104923 A1 | 5/2012 | Jung et al. |
| 2012/0118002 A1 | 5/2012 | Kim et al. |
| 2012/0125039 A1 | 5/2012 | Hwang |
| 2012/0128920 A1 | 5/2012 | Yoon et al. |
| 2012/0231204 A1 | 9/2012 | Jeon et al. |
| 2012/0269996 A1 | 10/2012 | Jäger |
| 2012/0326587 A1 | 12/2012 | Jeong et al. |
| 2013/0008309 A1 | 1/2013 | Hashida |
| 2013/0026900 A1 | 1/2013 | Oh et al. |
| 2013/0099650 A1 | 4/2013 | Lee et al. |
| 2013/0105494 A1 | 5/2013 | Jung |
| 2013/0105496 A1 | 5/2013 | Jung |
| 2013/0195544 A1 | 8/2013 | Sanders et al. |
| 2013/0255304 A1 | 10/2013 | Cur et al. |
| 2013/0257257 A1 | 10/2013 | Cur |
| 2013/0293080 A1 | 11/2013 | Kim |
| 2014/0103791 A1 | 4/2014 | Cheon |
| 2014/0132142 A1 | 5/2014 | Kim et al. |
| 2014/0216100 A1 | 8/2014 | Toshimitsu et al. |
| 2014/0272208 A1 | 9/2014 | Song et al. |
| 2014/0315011 A1* | 10/2014 | Lee ........................ F16L 59/08 |
| | | 428/319.1 |
| 2014/0346942 A1 | 11/2014 | Kim et al. |
| 2015/0030800 A1 | 1/2015 | Jung et al. |
| 2015/0068401 A1 | 3/2015 | Hashida |
| 2015/0192356 A1 | 7/2015 | Kang et al. |
| 2016/0109172 A1 | 4/2016 | Kim et al. |
| 2016/0356542 A1 | 12/2016 | Kim et al. |
| 2017/0325634 A1 | 11/2017 | Cai et al. |
| 2018/0266620 A1 | 9/2018 | Kawarazaki et al. |
| 2018/0299060 A1 | 10/2018 | Song et al. |
| 2018/0313492 A1 | 11/2018 | Kitano et al. |
| 2019/0101320 A1 | 4/2019 | Dherde et al. |
| 2019/0128593 A1 | 5/2019 | Deka et al. |

FOREIGN PATENT DOCUMENTS

| | | |
|---|---|---|
| CN | 1276052 | 12/2000 |
| CN | 1286386 | 3/2001 |
| CN | 1515857 | 7/2004 |
| CN | 1576678 | 2/2005 |
| CN | 2700790 | 5/2005 |
| CN | 1666071 | 9/2005 |
| CN | 2748848 | 12/2005 |
| CN | 1731053 | 2/2006 |
| CN | 1820173 | 8/2006 |
| CN | 1896657 | 1/2007 |
| CN | 101072968 | 11/2007 |
| CN | 101171472 | 4/2008 |
| CN | 101349493 | 1/2009 |
| CN | 201191121 | 2/2009 |
| CN | 201428906 | 3/2010 |
| CN | 201764779 | 3/2011 |
| CN | 102032736 | 4/2011 |
| CN | 201811526 | 4/2011 |
| CN | 102099646 | 6/2011 |
| CN | 102116402 | 7/2011 |
| CN | 102261470 | 11/2011 |
| CN | 102455103 | 5/2012 |
| CN | 102455104 | 5/2012 |
| CN | 102455105 | 5/2012 |
| CN | 102735013 | 10/2012 |

(56) References Cited

FOREIGN PATENT DOCUMENTS

| | | |
|---|---|---|
| CN | 102818421 | 12/2012 |
| CN | 102840729 | 12/2012 |
| CN | 102927740 | 2/2013 |
| CN | 103062981 | 4/2013 |
| CN | 103090615 | 5/2013 |
| CN | 103090616 | 5/2013 |
| CN | 103154648 | 6/2013 |
| CN | 103189696 | 7/2013 |
| CN | 103228851 | 7/2013 |
| CN | 203095854 | 7/2013 |
| CN | 103363764 | 10/2013 |
| CN | 103370587 | 10/2013 |
| CN | 103542660 | 1/2014 |
| CN | 103575038 | 2/2014 |
| CN | 103649658 | 3/2014 |
| CN | 103968196 | 8/2014 |
| CN | 104180595 | 12/2014 |
| CN | 104204646 | 12/2014 |
| CN | 104254749 | 12/2014 |
| CN | 104344653 | 2/2015 |
| CN | 104457117 A | 3/2015 |
| CN | 104482707 | 4/2015 |
| CN | 104567215 | 4/2015 |
| CN | 104634047 | 5/2015 |
| CN | 104729201 | 6/2015 |
| CN | 104746690 | 7/2015 |
| CN | 105546923 | 5/2016 |
| CN | 108354755 | 8/2018 |
| DE | 956 899 | 1/1957 |
| DE | 28 02 910 | 8/1978 |
| DE | 29 39 878 | 4/1981 |
| DE | 31 21 351 | 12/1982 |
| DE | 9204365 | 7/1992 |
| DE | 0658716 A1 * | 6/1995 ............ F25D 23/06 |
| DE | 197 45 825 | 4/1999 |
| DE | 1 980 3908 | 8/1999 |
| DE | 299 12 917 | 11/1999 |
| DE | 199 07 182 | 8/2000 |
| DE | 10-2011-050473 | 11/2011 |
| DE | 10 2011 014 302 | 9/2012 |
| DE | 10 2011 079 209 | 1/2013 |
| DE | 10-2012-100490 | 7/2013 |
| DE | 10-2012-223539 | 6/2014 |
| EP | 0 071 090 | 2/1983 |
| EP | 0 658 733 | 6/1995 |
| EP | 0 892 120 | 1/1999 |
| EP | 1 477 752 | 11/2004 |
| EP | 1 484 563 | 12/2004 |
| EP | 1 614 954 | 1/2006 |
| EP | 2 333 179 | 6/2011 |
| EP | 2 447 639 | 5/2012 |
| EP | 2 806 239 | 11/2014 |
| EP | 2 824 405 | 1/2015 |
| EP | 2 829 827 | 1/2015 |
| EP | 2 936 013 | 10/2015 |
| EP | 2 952 839 | 12/2015 |
| EP | 2 789 951 | 10/2020 |
| GB | 890372 | 2/1962 |
| GB | 2 446 053 | 7/2008 |
| JP | H04-341694 | 11/1992 |
| JP | H05-10494 | 1/1993 |
| JP | H07-234067 | 9/1995 |
| JP | H09-145241 | 6/1997 |
| JP | 11-211334 | 8/1999 |
| JP | H11335114 | 12/1999 |
| JP | 2002-243091 A | 8/2002 |
| JP | 2003-106760 | 4/2003 |
| JP | 2003-269688 | 9/2003 |
| JP | 2004-044980 | 2/2004 |
| JP | 2004-196411 | 7/2004 |
| JP | 2005-214372 A | 8/2005 |
| JP | 2007-218509 | 8/2007 |
| JP | 2008-045580 | 2/2008 |
| JP | 2008-249003 | 10/2008 |
| JP | 2009-078261 A | 4/2009 |
| JP | 2010-008011 | 1/2010 |
| JP | 2010008011 | 1/2010 |
| JP | 2012-087993 | 5/2012 |
| JP | 2012-255607 | 12/2012 |
| JP | 2013-119966 A | 6/2013 |
| JP | 2014-037931 | 2/2014 |
| KR | 10-2001-0073363 | 8/2001 |
| KR | 10-0343719 | 7/2002 |
| KR | 10-0411841 | 12/2003 |
| KR | 10-2005-0065088 | 6/2005 |
| KR | 20070052156 | 5/2007 |
| KR | 10-2009-0111632 | 10/2009 |
| KR | 10-2010-0097410 | 9/2010 |
| KR | 10-2010-0099629 | 9/2010 |
| KR | 10-2010-0119937 | 11/2010 |
| KR | 10-2010-0136614 | 12/2010 |
| KR | 10-2011-0015322 | 2/2011 |
| KR | 10-2011-0015325 | 2/2011 |
| KR | 10-2011-0015327 | 2/2011 |
| KR | 10-1041086 | 6/2011 |
| KR | 10-2011-0100440 | 9/2011 |
| KR | 10-2012-0044558 A | 5/2012 |
| KR | 10-2012-0139648 | 12/2012 |
| KR | 10-1227516 | 1/2013 |
| KR | 10-2013-0048528 | 5/2013 |
| KR | 10-2013-0048530 A | 5/2013 |
| KR | 10-2013-0054213 | 5/2013 |
| KR | 10-2014-0129552 | 11/2014 |
| KR | 10-2015-0012712 | 2/2015 |
| KR | 10-1506413 | 3/2015 |
| NL | 1005962 | 11/1998 |
| RU | 129188 | 6/2013 |
| WO | WO-9325843 A1 * | 12/1993 ............ F16L 59/065 |
| WO | WO 2006/003199 | 1/2006 |
| WO | WO 2012/084874 | 6/2012 |
| WO | WO 2012/176880 | 12/2012 |
| WO | WO 2013/007568 | 1/2013 |
| WO | WO 2014/049969 | 4/2014 |
| WO | WO 2014/175639 | 10/2014 |
| WO | WO 2016/208193 A1 | 12/2016 |
| WO | WO 2017/023095 | 2/2017 |
| WO | WO 2017/192121 | 11/2017 |
| WO | WO 2018/044274 | 3/2018 |

OTHER PUBLICATIONS

Machine translation of EP 2952839 (Year: 2015).*
Korean Office Action dated Aug. 1, 2021 issued in KR Application No. 10-2021-0085731.
Chinese Office Action dated Aug. 2, 2021 issued in CN Application No. 202010972409.5.
Chinese Office Action dated Aug. 3, 2021 issued in CN Application No. 202010972419.9.
Chinese Office Action dated Aug. 4, 2021 issued in CN Application No. 202010972442.8.
United States Office Action dated Oct. 5, 2021 issued in co-pending related U.S. Appl. No. 16/942,262.
United States Office Action dated Oct. 19, 2021 issued in co-pending related U.S. Appl. No. 17/021,582.
United States Office Action dated Oct. 26, 2021 issued in co-pending related U.S. Appl. No. 16/942,213.
International Search Report and Written Opinion dated Oct. 12, 2016 issued in Application No. PCT/KR2016/008465.
International Search Report and Written Opinion dated Oct. 12, 2016 issued in Application No. PCT/KR2016/008507.
International Search Report and Written Opinion dated Nov. 21, 2016 issued in Application No. PCT/KR2016/008466.
International Search Report and Written Opinion dated Nov. 21, 2016 issued in Application No. PCT/KR2016/008468.
International Search Report and Written Opinion dated Nov. 21, 2016 issued in Application No. PCT/KR2016/008469.
International Search Report and Written Opinion dated Nov. 21, 2016 issued in Application No. PCT/KR2016/008470.
International Search Report and Written Opinion dated Nov. 21, 2016 issued in Application No. PCT/KR2016/008501.

(56) References Cited

OTHER PUBLICATIONS

International Search Report and Written Opinion dated Nov. 21, 2016 issued in Application No. PCT/KR2016/008502.
International Search Report and Written Opinion dated Nov. 21, 2016 issued in Application No. PCT/KR2016/008505.
International Search Report and Written Opinion dated Nov. 21, 2016 issued in Application No. PCT/KR2016/008519.
International Search Report and Written Opinion dated Nov. 21, 2016 issued in Application No. PCT/KR2016/008523.
International Search Report and Written Opinion dated Dec. 7, 2016 issued in Application No. PCT/KR2016/008516.
International Search Report and Written Opinion dated Dec. 23, 2016 issued in Application No. PCT/KR2016/008512.
International Search Report and Written Opinion dated Dec. 23, 2016 issued in Application No. PCT/KR2016/008514.
Russian Office Action dated Sep. 25, 2018 issued in RU Application No. 2018107646.
European Search Report dated Dec. 21, 2018 issued in EP Application No. 16833330.0.
European Search Report dated Feb. 13, 2019 issued in EP Application No. 16833309.4.
European Search Report dated Feb. 13, 2019 issued in EP Application No. 16833311.0.
European Search Report dated Feb. 20, 2019 issued in EP Application No. 16833313.6.
European Search Report dated Feb. 22, 2019 issued in EP Application No. 16833312.8.
European Search Report dated Feb. 26, 2019 issued in EP Application No. 16833324.3.
European Search Report dated Feb. 26, 2019 issued in EP Application No. 16833336.7.
European Search Report dated Mar. 1, 2019 issued in EP Application No. 16833323.5.
European Search Report dated Mar. 1, 2019 issued in EP Application No. 16833338.3.
European Search Report dated Mar. 13, 2019 issued in EP Application No. 16833331.8.
European Search Report dated Mar. 15, 2019 issued in EP Application No. 16833326.8.
European Search Report dated Apr. 3, 2019 issued in EP Application No. 16833325.0.
U.S. Office Action dated Jun. 13, 2019 issued in related U.S. Appl. No. 15/749,139.
U.S. Office Action dated Jun. 13, 2019 issued in related U.S. Appl. No. 15/749,142.
U.S. Office Action dated Jun. 13, 2019 issued in related U.S. Appl. No. 15/749,136.
U.S. Office Action dated Sep. 20, 2019 issued in U.S. Appl. No. 15/749,149.
U.S. Office Action dated Oct. 4, 2019 issued in related U.S. Appl. No. 15/749,140.
Chinese Office Action (with English translation) dated Jul. 15, 2019 issued in CN Application No. 201680045949.0.
Chinese Office Action (with English translation) dated Aug. 5, 2019 issued in CN Application No. 201680045869.5.
Chinese Office Action (with English translation) dated Aug. 5, 2019 issued in CN Application No. 201680045899.6.
Chinese Office Action (with English translation) dated Aug. 5, 2019 issued in CN Application No. 201680045908.1.
Chinese Office Action (with English translation) dated Aug. 5, 2019 issued in CN Application No. 201680045935.9.
Chinese Office Action (with English translation) dated Aug. 5, 2019 issued in CN Application No. 201680046042.6.
Chinese Office Action (with English translation) dated Aug. 5, 2019 issued in CN Application No. 201680046048.3.
Chinese Office Action (with English translation) dated Aug. 13, 2019 issued in CN Application No. 201680045950.3.
Chinese Office Action (with English translation) dated Sep. 19, 2019 issued in CN Application No. 201680045897.7.
Chinese Office Action (with English translation) dated Sep. 19, 2019 issued in CN Application No. 201680045898.1.
Chinese Office Action (with English translation) dated Sep. 19, 2019 issued in CN Application No. 201680046047.9.
U.S. Office Action dated Oct. 17, 2019 issued in U.S. Appl. No. 15/749,143.
U.S. Office Action dated Oct. 17, 2019 issued in U.S. Appl. No. 15/749,162.
U.S. Office Action dated Oct. 17, 2019 issued in parent U.S. Appl. No. 15/749,147.
U.S. Office Action dated Dec. 10, 2019 issued in U.S. Appl. No. 15/749,132.
U.S. Office Action dated Feb. 18, 2020 issued in co-pending related U.S. Appl. No. 15/749,146.
U.S. Office Action dated Mar. 20, 2020 issued in co-pending related U.S. Appl. No. 15/749,162.
U.S. Office Action dated Mar. 24, 2020 issued in co-pending related U.S. Appl. No. 15/749,154.
U.S. Office Action dated May 25, 2020 issued in co-pending related U.S. Appl. No. 15/749,156.
U.S. Office Action dated Mar. 27, 2020 issued in co-pending related U.S. Appl. No. 15/749,149.
U.S. Office Action dated Apr. 15, 2020 issued in co-pending related U.S. Appl. No. 15/749,136.
U.S. Notice of Allowance dated Apr. 15, 2020 issued in co-pending related U.S. Appl. No. 15/749,140.
Korean Office Action dated Jun. 5, 2020 issued in Application 10-2017-0093784.
Extended European Search Report dated Jul. 10, 2020 issued in Application 20168389.3.
U.S. Office Action dated Sep. 1, 2020 issued in U.S. Appl. No. 15/749,156.
Chinese Office Action dated Jun. 24, 2021 issued in CN Application No. 202010669926.5.
European Office Action dated Jan. 11, 2021 issued in Application 16 833 313.6.
U.S. Office Action dated Mar. 31, 2021 issued in co-pending U.S. Appl. No. 15/749,132.
U.S. Appl. No. 15/749,132, filed Jan. 31, 2018.
Chinese Office Action dated Apr. 6, 2021 issued in CN Application No. 202010248772.2.
Chinese Office Action dated Apr. 6, 2021 issued in CN Application No. 202010248789.8.
Chinese Office Action dated Apr. 6, 2021 issued in CN Application No. 202010248791.5.
Chinese Office Action dated Apr. 8, 2021 issued in CN Application No. 202010248891.8.
Chinese Office Action dated Jun. 2, 2021 issued in CN Application No. 202010634146.7.
Chinese Office Action dated Jun. 23, 2021 issued in CN Application No. 202010669915.7.
United States Office Action dated Jun. 28, 2021 issued in co-pending related U.S. Appl. No. 15/749,156.
Chinese Office Action and Search Report dated Jul. 20, 2021 issued in Application 20101067100.X.
United States Office Action dated Mar. 31, 2022 issued in co-pending related U.S. Appl. No. 16/929,523.
United States Office Action dated Mar. 2, 2022 issued in co-pending related U.S. Appl. No. 17/170,005.
U.S. Appl. No. 16/942,262, filed Jul. 29, 2020.
U.S. Appl. No. 15/749,156, filed Jan. 31, 2018.
Chinese Office Action dated May 18, 2022 issued in CN Application No. 202110718315.X.
Chinese Office Action dated Dec. 3, 2021 issued in CN Application No. 202110032077.7.
European Search Report dated Feb. 8, 2022 issued in EP Application No. 21203498.7.
Chinese Office Action dated Feb. 15, 2022 issued in CN Application No. 202010671000.X.
Chinese Office Action dated Feb. 18, 2022 issued in CN Application No. 202010975466.9.
United States Office Action dated Jun. 10, 2022 issued in co-pending related U.S. Appl. No. 16/942,213.

(56) References Cited

OTHER PUBLICATIONS

European Search Report dated Oct. 11, 2021 issued in EP Application No. 21185349.4.
European Search Report dated Oct. 11, 2021 issued in EP Application No. 21185362.7.
U.S. Appl. No. 17/114,950, filed Dec. 8, 2020.
U.S. Appl. No. 16/929,523, filed Jul. 15, 2020.
U.S. Appl. No. 17/021,582, filed Sep. 15, 2020.
U.S. Appl. No. 17/134,911, filed Dec. 28, 2020.
European Office Action dated Nov. 21, 2022 issued in EP Application No. 20168389.3.
United States Office Action dated Nov. 25, 2022 issued in co-pending related U.S. Appl. No. 17/411,659.
United States Office Action dated Oct. 6, 2022 issued in co-pending related U.S. Appl. No. 17/072,231.
United States Office Action dated Jul. 7, 2022 issued in co-pending related U.S. Appl. No. 16/710,210.
United States Office Action dated Jul. 13, 2022 issued in co-pending related U.S. Appl. No. 17/134,911.
Chinese Notice of Allowance dated Jun. 1, 2022 issued in CN Application No. 202110032072.4.
Korean Office Action dated Aug. 8, 2022 issued in KR Application No. 10-2015-0109622.
U.S. Appl. No. 18/095,658, filed May 20, 2022.
Korean Notice of Allowance dated Nov. 2, 2022 issued in KR Application No. 10-2015-0109720.
United States Office Action dated Jan. 18, 2023 issued in co-pending related U.S. Appl. No. 16/942,213.
Korean Notice of Allowance dated Jun. 1, 2022 issued in KR Application No. 10-2021-0085731.
United States Office Action dated Dec. 22, 2022 issued in co-pending related U.S. Appl. No. 16/953,846.
European Search Report dated Nov. 3, 2022 issued in EP Application No. 22151005.0.
U.S. Office Action dated Apr. 27, 2023 issued in U.S. Appl. No. 17/072,231.
U.S. Notice of Allowance dated Mar. 23, 2023 issued in U.S. Appl. No. 16/953,846.
Korean Office Action dated Jul. 31, 2023 issued in Application 10-2023-0020717.
Chinese Office Action dated Aug. 30, 2023 issued in Application No. 202110718284.8.
Korean Office Action dated Nov. 1, 2023 issued in Application No. 10-2023-0015566.
U.S. Appl. No. 17/411,659, filed Aug. 25, 2021.
U.S. Appl. No. 18/091,203, filed Dec. 29, 2022.
U.S. Appl. No. 17/170,005, filed Feb. 8, 2021.
U.S. Appl. No. 17/939,507, filed Sep. 7, 2022.
U.S. Appl. No. 16/942,213, filed Jul. 29, 2020.
U.S. Appl. No. 17/749,679, filed May 20, 2022.
U.S. Appl. No. 17/582,596, filed Jan. 24, 2022.
U.S. Appl. No. 17/030,806, filed Sep. 24, 2020.
U.S. Appl. No. 18/095,658, filed Jan. 11, 2023.
U.S. Appl. No. 16/710,720, filed Dec. 11, 2019.
U.S. Appl. No. 18/237,531, filed Aug. 24, 2023.
U.S. Appl. No. 17/980,088, filed Nov. 3, 2022.
U.S. Appl. No. 17/072,231, filed Oct. 16, 2020.
U.S. Appl. No. 16/953,846, filed Nov. 20, 2020.
U.S. Appl. No. 17/155,430, filed Jan. 22, 2021.
U.S. Appl. No. 18/091,040, filed Dec. 29, 2022.
U.S. Notice of Allowance dated Oct. 23, 2023, issued in U.S. Appl. No. 17/072,231.
Korean Office Action dated Nov. 13, 2023 issued in Application No. 10-2023-0014241.

* cited by examiner

[Fig. 1]
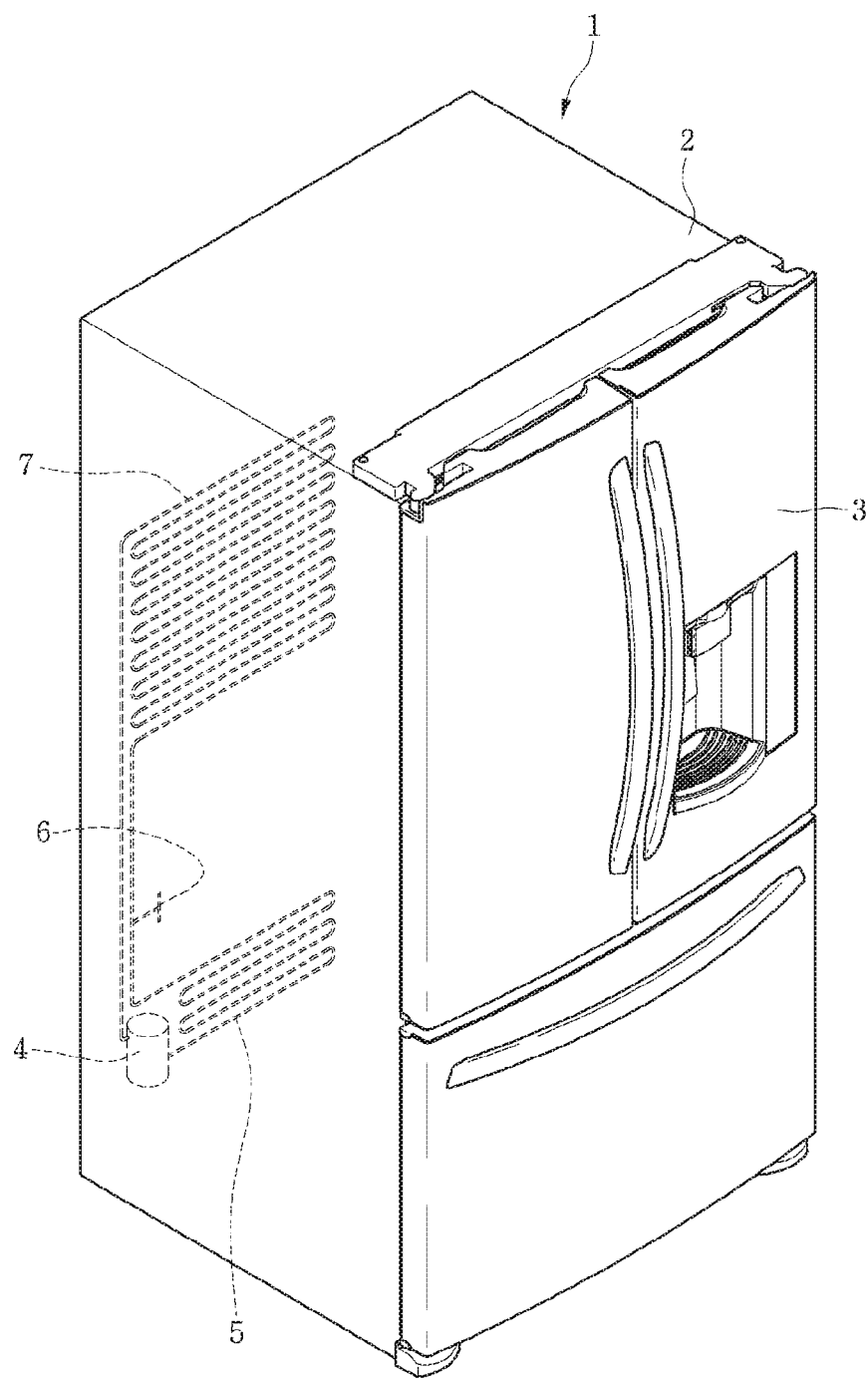

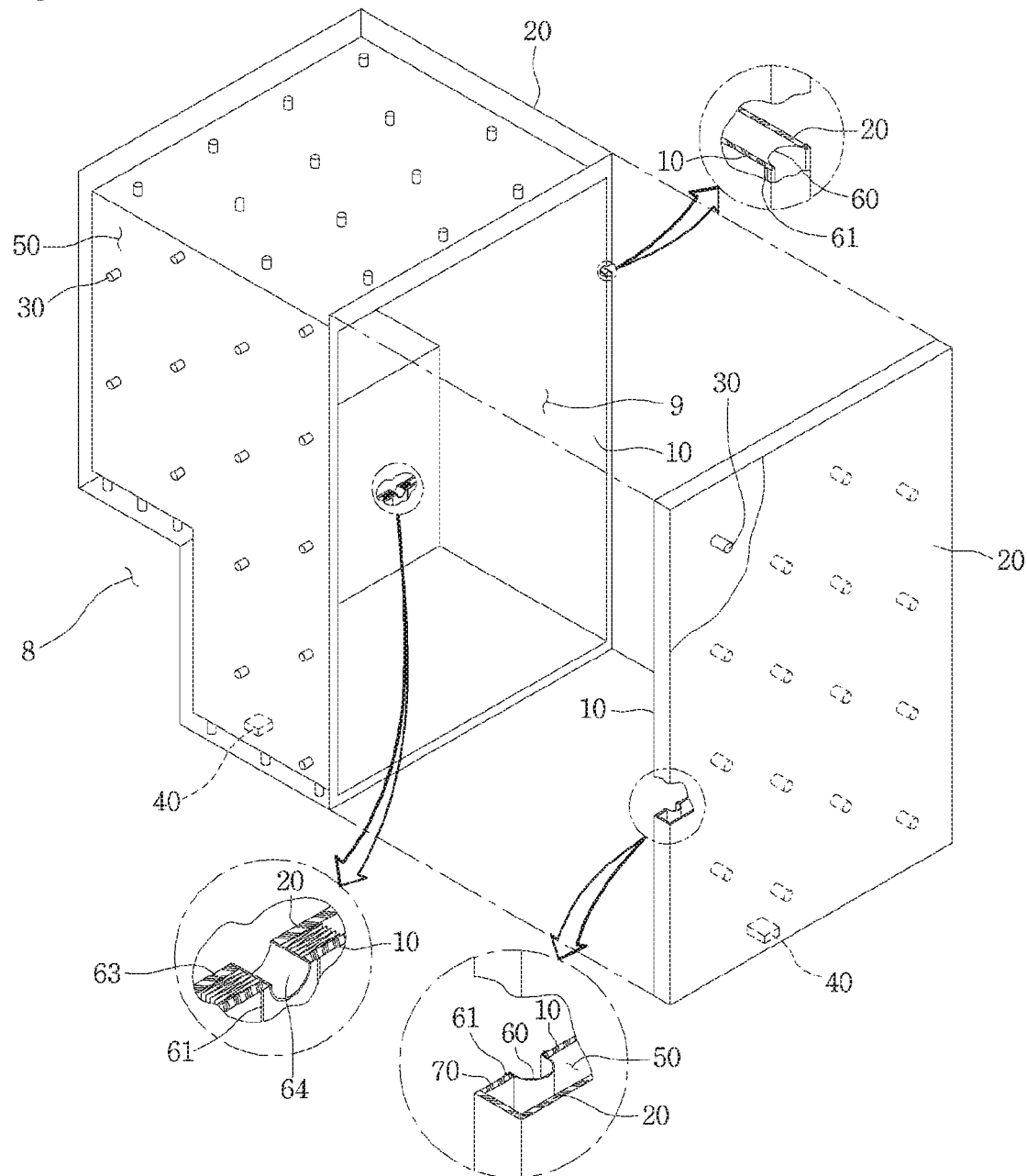
[Fig. 2]

[Fig. 3]
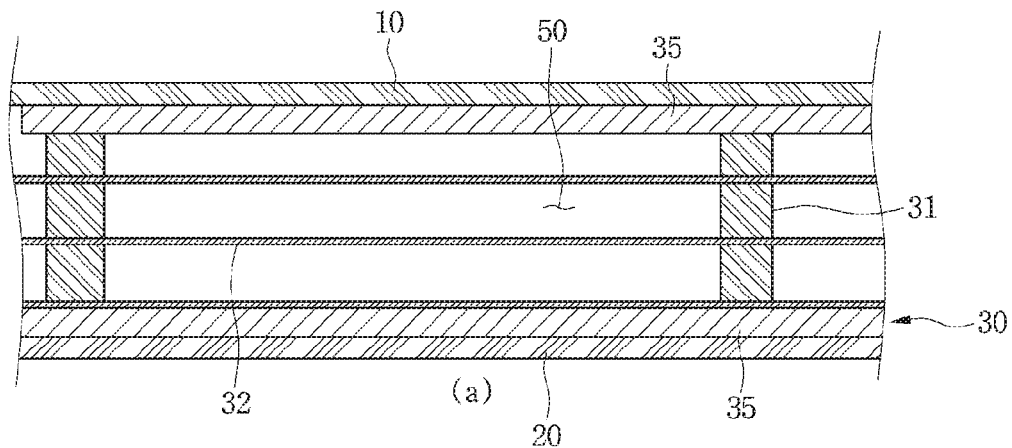
(a)
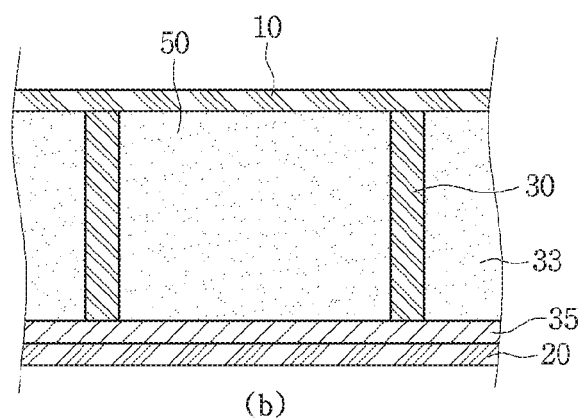
(b)
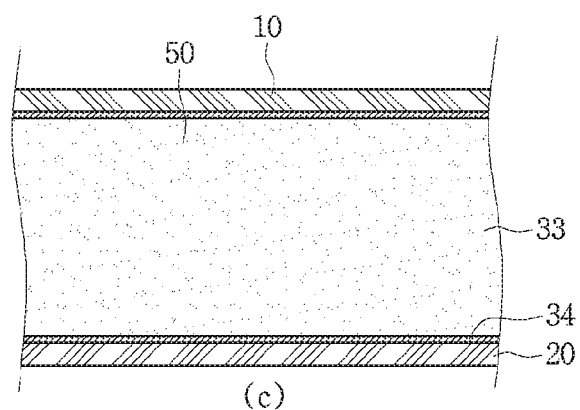
(c)

[Fig. 4]
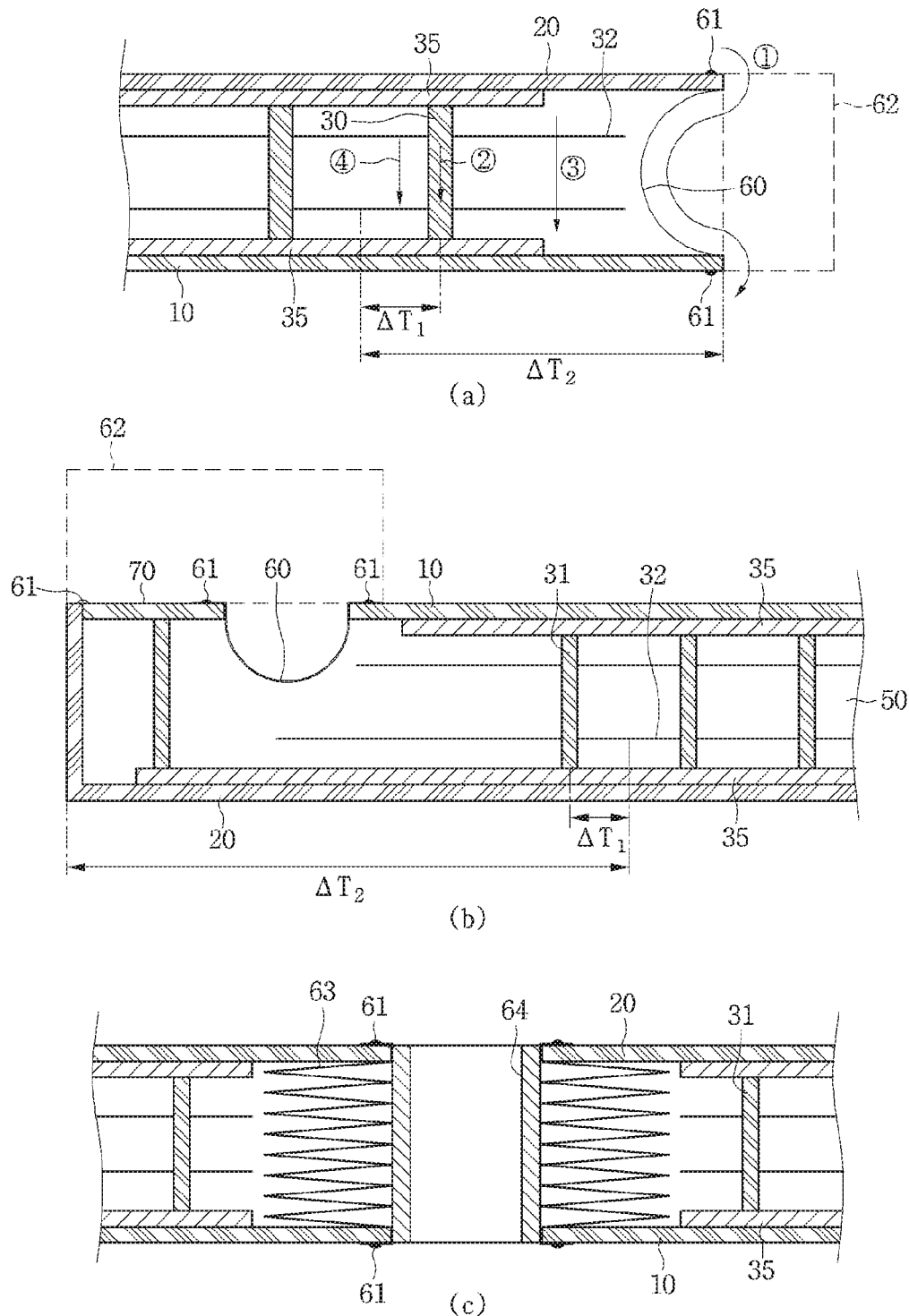

[Fig. 6]
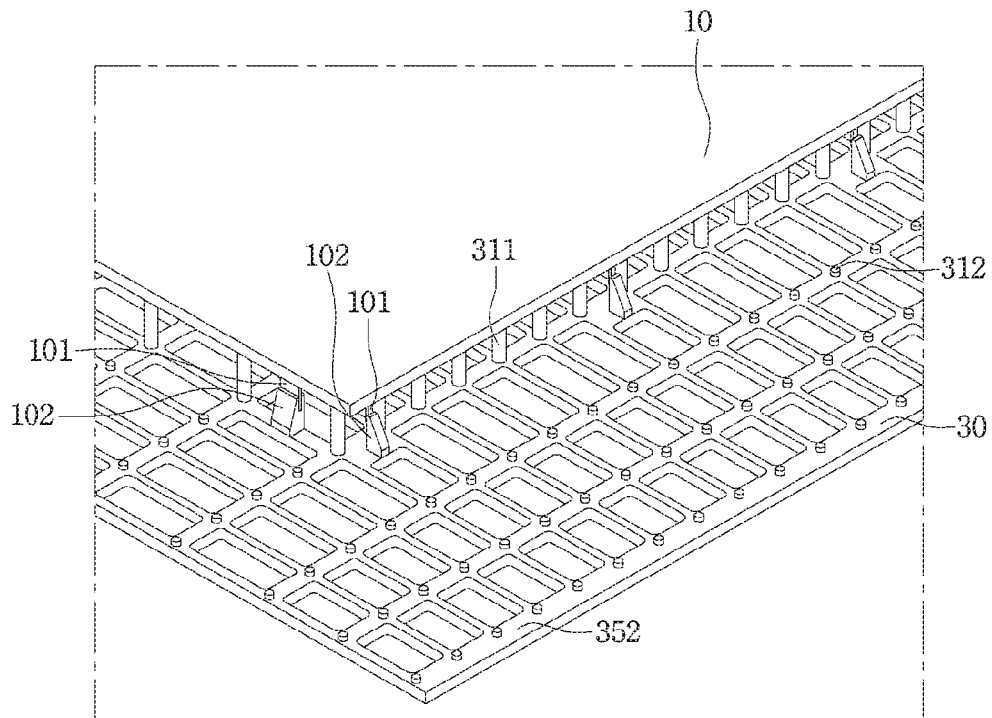
[Fig. 7]
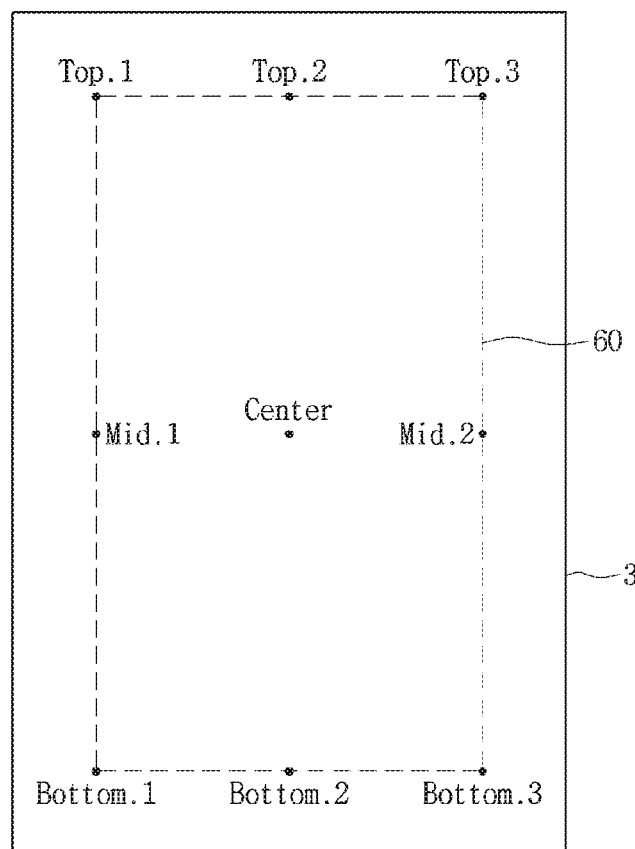

[Fig. 8]
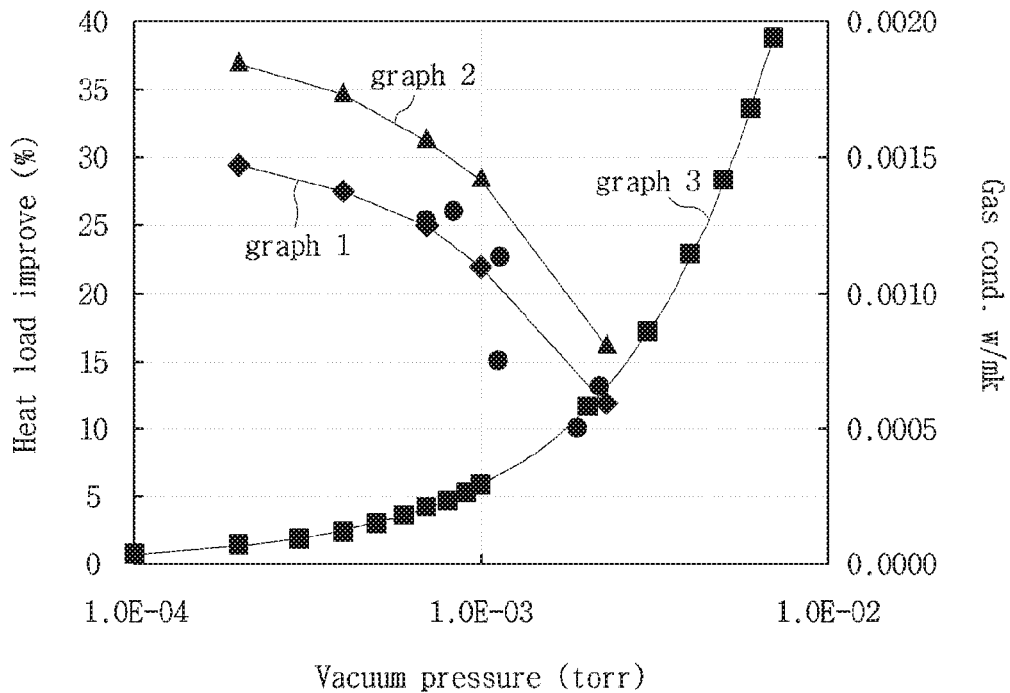
[Fig. 9]
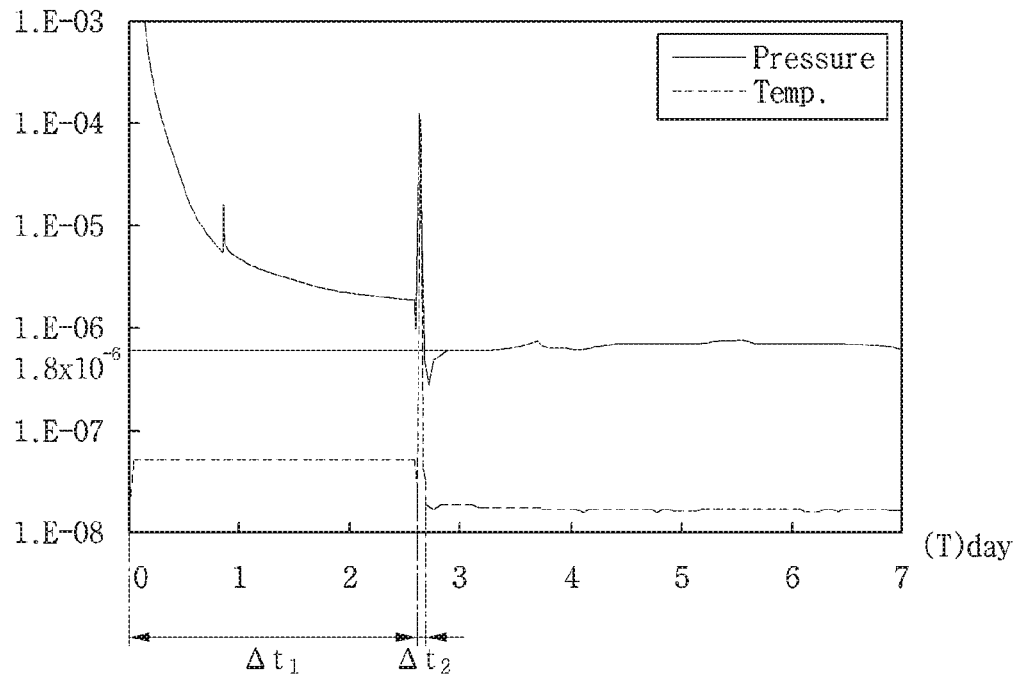

[Fig. 10]
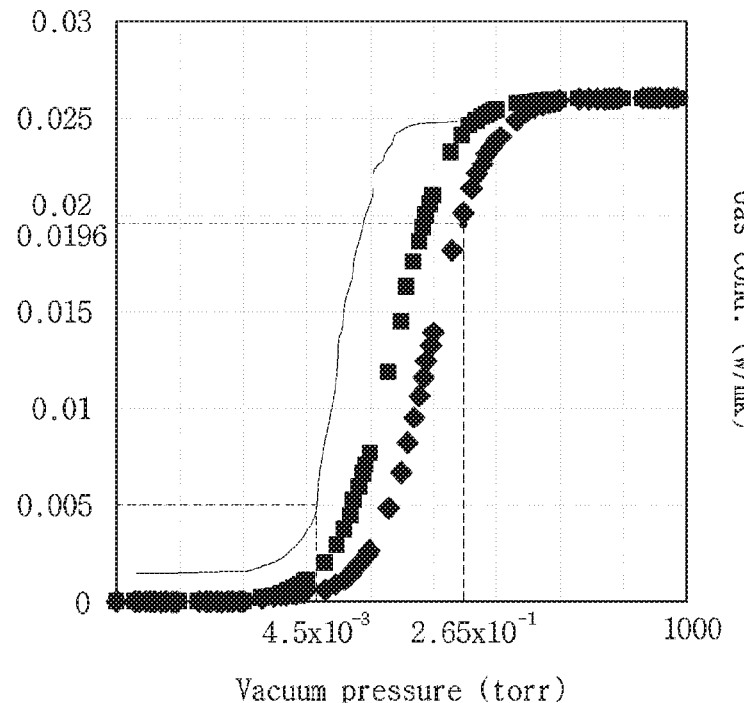
[Fig. 11]
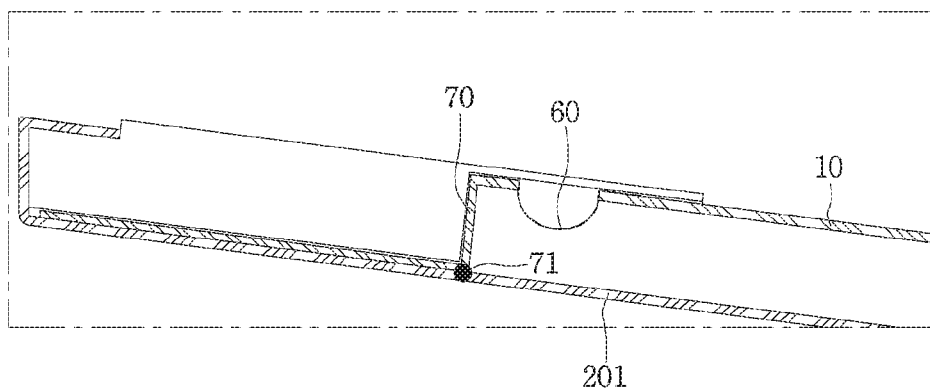

VACUUM ADIABATIC BODY AND REFRIGERATOR

CROSS-REFERENCE TO RELATED APPLICATIONS

This application is a Divisional Application of U.S. patent application Ser. No. 15/749,162 filed Jan. 31, 2018, which is a U.S. National Stage Application under 35 U.S.C. § 371 of PCT Application No. PCT/KR2016/008466, filed Aug. 1, 2016, which claims priority to Korean Patent Application No. 10-2015-0109728, filed Aug. 3, 2015, whose entire disclosures are hereby incorporated by reference.

BACKGROUND

1. Field

The present disclosure relates to a vacuum adiabatic body and a refrigerator.

2. Background

A vacuum adiabatic body is a product for suppressing heat transfer by vacuumizing the interior of a body thereof. The vacuum adiabatic body can reduce heat transfer by convection and conduction, and hence is applied to heating apparatuses and refrigerating apparatuses. In a typical adiabatic method applied to a refrigerator, although it is differently applied in refrigeration and freezing, a foam urethane adiabatic wall having a thickness of about 30 cm or more is generally provided. However, the internal volume of the refrigerator is therefore reduced.

In order to increase the internal volume of a refrigerator, there is an attempt to apply a vacuum adiabatic body to the refrigerator.

First, Korean Patent No. 10-0343719 (Reference Document 1) of the present applicant has been disclosed. According to Reference Document 1, there is disclosed a method in which a vacuum adiabatic panel is prepared and then built in walls of a refrigerator, and the exterior of the vacuum adiabatic panel is finished with a separate molding as Styrofoam (polystyrene). According to the method, additional foaming is not required, and the adiabatic performance of the refrigerator is improved. However, manufacturing cost is increased, and a manufacturing method is complicated. As another example, a technique of providing walls using a vacuum adiabatic material and additionally providing adiabatic walls using a foam filling material has been disclosed in Korean Patent Publication No. 10-2015-0012712 (Reference Document 2). According to Reference Document 2, manufacturing cost is increased, and a manufacturing method is complicated.

As another example, there is an attempt to manufacture all walls of a refrigerator using a vacuum adiabatic body that is a single product. For example, a technique of providing an adiabatic structure of a refrigerator to be in a vacuum state has been disclosed in U.S. Patent Laid-Open Publication No. US 2004/0226956 A1 (Reference Document 3).

BRIEF DESCRIPTION OF THE DRAWINGS

The embodiments will be described in detail with reference to the following drawings in which like reference numerals refer to like elements wherein:

FIG. 1 is a perspective view of a refrigerator according to an embodiment.

FIG. 2 is a view schematically showing a vacuum adiabatic body used in a main body and a door of the refrigerator.

FIG. 3 is a view showing various embodiments of an internal configuration of a vacuum space part.

FIG. 4 is a view showing various embodiments of conductive resistance sheets and peripheral parts thereof.

FIG. 6 is a view a correlation between a supporting unit and a first plate member, which illustrates any one edge portion.

FIG. 7 is a view showing an experimental result obtained by comparing the vacuum adiabatic body provided in FIG. 5 and a vacuum adiabatic body provided in FIG. 11.

FIG. 8 illustrates graphs showing changes in adiabatic performance and changes in gas conductivity with respect to vacuum pressures by applying a simulation.

FIG. 9 illustrates graphs obtained by observing, over time and pressure, a process of exhausting the interior of the vacuum adiabatic body when a supporting unit is used.

FIG. 10 illustrates graphs obtained by comparing vacuum pressures and gas conductivities.

FIG. 11 illustrates a comparative example of the vacuum adiabatic body.

DETAILED DESCRIPTION

Figure 5:
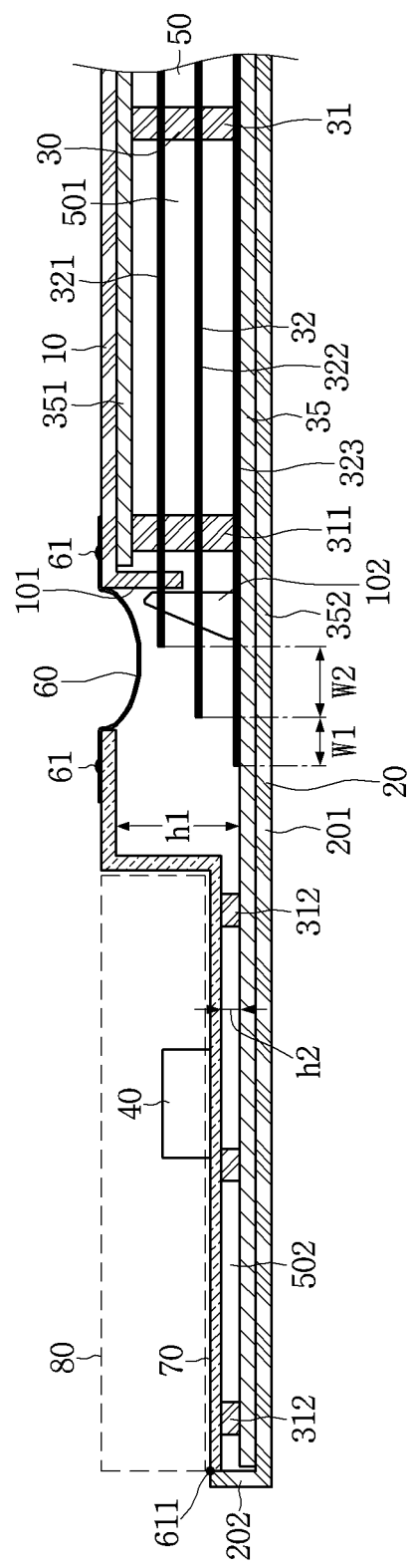
FIG. 5 is a view illustrating in detail a vacuum adiabatic body according to an embodiment.

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the disclosure may be practiced. These embodiments are described in sufficient detail to enable those skilled in the art to practice the disclosure, and it is understood that other embodiments may be utilized and that logical structural, mechanical, electrical, and chemical changes may be made without departing from the spirit or scope of the disclosure. To avoid detail not necessary to enable those skilled in the art to practice the disclosure, the description may omit certain information known to those skilled in the art. The following detailed description is, therefore, not to be taken in a limiting sense.

In the following description, the term 'vacuum pressure' means a certain pressure state lower than atmospheric pressure. In addition, the expression that a vacuum degree of A is higher than that of B means that a vacuum pressure of A is lower than that of B.

FIG. 1 is a perspective view of a refrigerator according to an embodiment.

Referring to FIG. 1, the refrigerator 1 includes a main body 2 provided with a cavity 9 capable of storing storage goods and a door 3 provided to open/close the main body 2. The door 3 may be rotatably or movably disposed to open/close the cavity 9. The cavity 9 may provide at least one of a refrigerating chamber and a freezing chamber.

Parts constituting a freezing cycle may include those in which cold air is supplied into the cavity 9. Specifically, the parts include a compressor 4 for compressing a refrigerant, a condenser 5 for condensing the compressed refrigerant, an expander 6 for expanding the condensed refrigerant, and an evaporator 7 for evaporating the expanded refrigerant to take heat. As a typical structure, a fan may be installed at a position adjacent to the evaporator 7, and a fluid blown from the fan may pass through the evaporator 7 and then be blown into the cavity 9. A freezing load is controlled by adjusting the blowing amount and blowing direction by the fan, adjusting the amount of a circulated refrigerant, or adjusting the compression rate of the compressor, so that it is possible to control a refrigerating space or a freezing space.

FIG. 2 is a view schematically showing a vacuum adiabatic body used in the main body and the door of the refrigerator. In FIG. 2, a main body-side vacuum adiabatic body is illustrated in a state in which top and side walls are removed, and a door-side vacuum adiabatic body is illustrated in a state in which a portion of a front wall is removed. In addition, sections of portions at conductive resistance sheets are provided are schematically illustrated for convenience of understanding.

Referring to FIG. 2, the vacuum adiabatic body includes a first plate member (or first plate) 10 for providing a wall of a low-temperature space, a second plate member (or second plate) 20 for providing a wall of a high-temperature space, and a vacuum space part (or vacuum space, cavity) 50 defined as a gap part (or gap, space) between the first and second plate members 10 and 20. Also, the vacuum adiabatic body includes the conductive resistance sheets 60 and 63 for preventing heat conduction between the first and second plate members 10 and 20. A sealing part (or seal, sealing joint) 61 for sealing the first and second plate members 10 and 20 is provided such that the vacuum space part 50 is in a sealing state. When the vacuum adiabatic body is applied to a refrigerating or heating cabinet, the first plate member 10 may be referred to as an inner case, and the second plate member 20 may be referred to as an outer case. A machine chamber 8 in which parts providing a freezing cycle are accommodated is placed at a lower rear side of the main body-side vacuum adiabatic body, and an exhaust port 40 for forming a vacuum state by exhausting air in the vacuum space part 50 is provided at any one side of the vacuum adiabatic body. In addition, a pipeline 64 passing through the vacuum space part 50 may be further installed so as to install a defrosting water line and electric lines.

The first plate member 10 may define at least one portion of a wall for a first space provided thereto. The second plate member 20 may define at least one portion of a wall for a second space provided thereto. The first space and the second space may be defined as spaces having different temperatures. Here, the wall for each space may serve as not only a wall directly contacting the space but also a wall not contacting the space. For example, the vacuum adiabatic body of the embodiment may also be applied to a product further having a separate wall contacting each space.

Factors of heat transfer, which cause loss of the adiabatic effect of the vacuum adiabatic body, are heat conduction between the first and second plate members 10 and 20, heat radiation between the first and second plate members 10 and 20, and gas conduction of the vacuum space part 50.

Hereinafter, a heat resistance unit provided to reduce adiabatic loss related to the factors of the heat transfer will be provided. The heat resistance unit may also be referred to as a thermal insulator, or the like, that provides one or more structural means configured to provide thermal insulation. Meanwhile, the vacuum adiabatic body and the refrigerator of the embodiment do not exclude that another adiabatic means is further provided to at least one side of the vacuum adiabatic body. Therefore, an adiabatic means using foaming or the like may be further provided to another side of the vacuum adiabatic body.

FIG. 3 is a view showing various embodiments of an internal configuration of the vacuum space part.

First, referring to FIG. 3a, the vacuum space part 50 is provided in a third space having a different pressure from the first and second spaces, preferably, a vacuum state, thereby reducing adiabatic loss. The third space may be provided at a temperature between the temperature of the first space and the temperature of the second space. Since the third space is provided as a space in the vacuum state, the first and second plate members 10 and 20 receive a force contracting in a direction in which they approach each other due to a force corresponding to a pressure difference between the first and second spaces. Therefore, the vacuum space part 50 may be deformed in a direction in which it is reduced. In this case, adiabatic loss may be caused due to an increase in amount of heat radiation, caused by the contraction of the vacuum space part 50, and an increase in amount of heat conduction, caused by contact between the plate members 10 and 20.

A supporting unit (or support) 30 may be provided to reduce the deformation of the vacuum space part 50. The supporting unit 30 includes bars 31. The bars 31 may extend in a direction substantially vertical to the first and second plate members 10 and 20 so as to support a distance between the first and second plate members 10 and 20. A support plate 35 may be additionally provided to at least one end of the bar 31. The support plate 35 connects at least two bars 31 to each other, and may extend in a direction horizontal to the first and second plate members 10 and 20. The support plate 35 may be provided in a plate shape, or may be provided in a lattice shape such that its area contacting the first or second plate member 10 or 20 is decreased, thereby reducing heat transfer. The bars 31 and the support plate 35 are fixed to each other at at least one portion, to be inserted together between the first and second plate members 10 and 20. The support plate 35 contacts at least one of the first and second plate members 10 and 20, thereby preventing deformation of the first and second plate members 10 and 20. In addition, based on the extending direction of the bars 31, a total sectional area of the support plate 35 is provided to be greater than that of the bars 31, so that heat transferred through the bars 31 can be diffused through the support plate 35.

A material of the supporting unit 30 may include a resin selected from the group consisting of PC, glass fiber PC, low outgassing PC, PPS, and LCP so as to obtain high compressive strength, low outgassing and water absorptance, low thermal conductivity, high compressive strength at high temperature, and excellent machinability.

A radiation resistance sheet 32 for reducing heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred. In addition, the supporting unit 30 made of the resin has a lower emissivity than the plate members, and is not entirely provided to inner surfaces of the first and second plate members 10 and 20. Hence, the supporting unit 30 does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20. A product having a low emissivity may be preferably used as the material of the radiation resistance sheet 32. In an embodiment, an aluminum foil having an emissivity of 0.02 may be used as the radiation resistance sheet 32. Since the transfer of radiation heat cannot be sufficiently blocked using one radiation resistance sheet, at least two radiation resistance sheets 32 may be provided at a certain distance so as not to contact each other. In addition, at least one radiation resistance sheet may be provided in a state in which it contacts the inner surface of the first or second plate member 10 or 20.

Referring to FIG. 3b, the distance between the plate members is maintained by the supporting unit 30, and a porous material 33 may be filled in the vacuum space part 50. The porous material 33 may have a higher emissivity than the stainless material of the first and second plate members 10 and 20. However, since the porous material 33 is filled in the vacuum space part 50, the porous material 33 has a high efficiency for resisting the radiation heat transfer.

In this embodiment, the vacuum adiabatic body can be manufactured without using the radiation resistance sheet 32.

Referring to FIG. 3c, the supporting unit 30 maintaining the vacuum space part 50 is not provided. Instead of the supporting unit 30, the porous material 33 is provided in a state in which it is surrounded by a film 34. In this case, the porous material 33 may be provided in a state in which it is compressed so as to maintain the gap of the vacuum space part 50. The film 34 is made of, for example, a PE material, and may be provided in a state in which holes are formed therein.

In this embodiment, the vacuum adiabatic body can be manufactured without using the supporting unit 30. In other words, the porous material 33 can serve together as the radiation resistance sheet 32 and the supporting unit 30.

FIG. 4 is a view showing various embodiments of the conductive resistance sheets and peripheral parts thereof. Structures of the conductive resistance sheets are briefly illustrated in FIG. 2, but will be understood in detail with reference to FIG. 4.

First, a conductive resistance sheet proposed in FIG. 4a may be preferably applied to the main body-side vacuum adiabatic body. Specifically, the first and second plate members 10 and 20 are to be sealed so as to vacuumize the interior of the vacuum adiabatic body. In this case, since the two plate members have different temperatures from each other, heat transfer may occur between the two plate members. A conductive resistance sheet 60 is provided to prevent heat conduction between two different kinds of plate members.

The conductive resistance sheet 60 may be provided with sealing parts 61 at which both ends of the conductive resistance sheet 60 are sealed to defining at least one portion of the wall for the third space and maintain the vacuum state. The conductive resistance sheet 60 may be provided as a thin foil in unit of micrometer so as to reduce the amount of heat conducted along the wall for the third space. The sealing parts 61 may be provided as welding parts. That is, the conductive resistance sheet 60 and the plate members 10 and 20 may be fused to each other. In order to cause a fusing action between the conductive resistance sheet 60 and the plate members 10 and 20, the conductive resistance sheet 60 and the plate members 10 and 20 may be made of the same material, and a stainless material may be used as the material. The sealing parts 61 are not limited to the welding parts, and may be provided through a process such as cocking. The conductive resistance sheet 60 may be provided in a curved shape. Thus, a heat conduction distance of the conductive resistance sheet 60 is provided longer than the linear distance of each plate member, so that the amount of heat conduction can be further reduced.

A change in temperature occurs along the conductive resistance sheet 60. Therefore, in order to block heat transfer to the exterior of the conductive resistance sheet 60, a shielding part 62 (or shield) may be provided at the exterior of the conductive resistance sheet 60 such that an adiabatic action occurs. In other words, in the refrigerator, the second plate member 20 has a high temperature and the first plate member 10 has a low temperature. In addition, heat conduction from high temperature to low temperature occurs in the conductive resistance sheet 60, and hence the temperature of the conductive resistance sheet 60 is suddenly changed. Therefore, when the conductive resistance sheet 60 is opened to the exterior thereof, heat transfer through the opened place may seriously occur. In order to reduce heat loss, the shielding part 62 is provided at the exterior of the conductive resistance sheet 60. For example, when the conductive resistance sheet 60 is exposed to any one of the low-temperature space and the high-temperature space, the conductive resistance sheet 60 does not serve as a conductive resistor as well as the exposed portion thereof, which is not preferable.

The shielding part 62 may be provided as a porous material contacting an outer surface of the conductive resistance sheet 60. The shielding part 62 may be provided as an adiabatic structure, e.g., a separate gasket, which is placed at the exterior of the conductive resistance sheet 60. The shielding part 62 may be provided as a portion of the vacuum adiabatic body, which is provided at a position facing a corresponding conductive resistance sheet 60 when the main body-side vacuum adiabatic body is closed with respect to the door-side vacuum adiabatic body. In order to reduce heat loss even when the main body and the door are opened, the shielding part 62 may be preferably provided as a porous material or a separate adiabatic structure.

A conductive resistance sheet proposed in FIG. 4b may be preferably applied to the door-side vacuum adiabatic body. In FIG. 4b, portions different from those of FIG. 4a are described in detail, and the same description is applied to portions identical to those of FIG. 4a. A side frame 70 is further provided at an outside of the conductive resistance sheet 60. A part for sealing between the door and the main body, an exhaust port necessary for an exhaust process, a getter port for vacuum maintenance, and the like may be placed on the side frame 70. This is because the mounting of parts is convenient in the main body-side vacuum adiabatic body, but the mounting positions of parts are limited in the door-side vacuum adiabatic body.

The side frame 70 may be provided to have a thinner thickness than each of the plate members 10 and 20. Accordingly, the side frame 70 may function to resist heat conduction with respect to cold air passing through the conductive resistance sheet 60.

In the door-side vacuum adiabatic body, it is difficult to place the conductive resistance sheet 60 at a front end portion of the vacuum space part, i.e., a corner side portion of the vacuum space part. This is because, unlike the main body, a corner edge portion of the door is exposed to the exterior. More specifically, if the conductive resistance sheet 60 is placed at the front end portion of the vacuum space part, the corner edge portion of the door is exposed to the exterior, and hence there is a disadvantage in that a separate adiabatic part should be configured so as to heat-insulate the conductive resistance sheet 60.

A conductive resistance sheet proposed in FIG. 4c may be preferably installed in the pipeline passing through the vacuum space part. In FIG. 4c, portions different from those of FIGS. 4a and 4b are described in detail, and the same description is applied to portions identical to those of FIGS. 4a and 4b. A conductive resistance sheet having the same shape as that of FIG. 4a, preferably, a wrinkled conductive resistance sheet (or folded conductive resistance sheet) 63 may be provided at a peripheral portion of the pipeline 64. Accordingly, a heat transfer path can be lengthened, and deformation caused by a pressure difference can be prevented. In addition, a separate shielding part may be provided to improve the adiabatic performance of the conductive resistance sheet.

A heat transfer path between the first and second plate members 10 and 20 will be described with reference back to FIG. 4a. Heat passing through the vacuum adiabatic body may be divided into surface conduction heat ① conducted along a surface of the vacuum adiabatic body, more specifically, the conductive resistance sheet 60, supporter conduction heat ② conducted along the supporting unit 30 provided inside the vacuum adiabatic body, gas conduction heat (or convection) ③ conducted through an internal gas in the vacuum space part, and radiation transfer heat ④ transferred through the vacuum space part.

The transfer heat may be changed depending on various depending on various design dimensions. For example, the supporting unit may be changed such that the first and second plate members 10 and 20 can endure a vacuum pressure without being deformed, the vacuum pressure may be changed, the distance between the plate members may be changed, and the length of the conductive resistance sheet may be changed. The transfer heat may be changed depending on a difference in temperature between the spaces (the first and second spaces) respectively provided by the plate members. In the embodiment, a preferred configuration of the vacuum adiabatic body has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as 19.6 mW/mK.

By performing a relative analysis on heat transfer amounts of the vacuum adiabatic body of the embodiment, a heat transfer amount by the gas conduction heat ③ can become smallest. For example, the heat transfer amount by the gas conduction heat ③ may be controlled to be equal to or smaller than 4% of the total heat transfer amount. A heat transfer amount by solid conduction heat defined as a sum of the surface conduction heat ① and the supporter conduction heat ② is largest. For example, the heat transfer amount by the solid conduction heat may reach 75% of the total heat transfer amount. A heat transfer amount by the radiation transfer heat ④ is smaller than the heat transfer amount by the solid conduction heat but larger than the heat transfer amount of the gas conduction heat ③. For example, the heat transfer amount by the radiation transfer heat ④ may occupy about 20% of the total heat transfer amount.

According to such a heat transfer distribution, effective heat transfer coefficients (eK: effective K) (W/mK) of the surface conduction heat ①, the supporter conduction heat ②, the gas conduction heat ③, and the radiation transfer heat ④ may have an order of Equation 1.

$$eK_{solid\ conduction\ heat} > eK_{radiation\ transfer\ heat} > eK_{gas\ conduction\ heat}$$

Equation 1

Here, the effective heat transfer coefficient (eK) is a value that can be measured using a shape and temperature differences of a target product. The effective heat transfer coefficient (eK) is a value that can be obtained by measuring a total heat transfer amount and a temperature at least one portion at which heat is transferred. For example, a calorific value (W) is measured using a heating source that can be quantitatively measured in the refrigerator, a temperature distribution (K) of the door is measured using heat respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body is a value given by $k=QL/A\Delta T$. Here, Q denotes a calorific value (W) and may be obtained using a calorific value of a heater. A denotes a sectional area (m2) of the vacuum adiabatic body, L denotes a thickness (m) of the vacuum adiabatic body, and $\Delta T$ denotes a temperature difference.

For the surface conduction heat, a conductive calorific value may be obtained through a temperature difference ($\Delta T$) between an entrance and an exit of the conductive resistance sheet 60 or 63, a sectional area (A) of the conductive resistance sheet, a length (L) of the conductive resistance sheet, and a thermal conductivity (k) of the conductive resistance sheet (the thermal conductivity of the conductive resistance sheet is a material property of a material and can be obtained in advance). For the supporter conduction heat, a conductive calorific value may be obtained through a temperature difference ($\Delta T$) between an entrance and an exit of the supporting unit 30, a sectional area (A) of the supporting unit, a length (L) of the supporting unit, and a thermal conductivity (k) of the supporting unit. Here, the thermal conductivity of the supporting unit is a material property of a material and can be obtained in advance. The sum of the gas conduction heat ③, and the radiation transfer heat ④ may be obtained by subtracting the surface conduction heat and the supporter conduction heat from the heat transfer amount of the entire vacuum adiabatic body. A ratio of the gas conduction heat ③, and the radiation transfer heat ④ may be obtained by evaluating radiation transfer heat when no gas conduction heat exists by remarkably lowering a vacuum degree of the vacuum space part 50.

When a porous material is provided inside the vacuum space part 50, porous material conduction heat ⑤ may be a sum of the supporter conduction heat ② and the radiation transfer heat ④. The porous material conduction heat ⑤ may be changed depending on various variables including a kind, an amount, and the like of the porous material.

According to an embodiment, a temperature difference $\Delta T1$ between a geometric center formed by adjacent bars 31 and a point at which each of the bars 31 is located may be preferably provided to be less than 0.5° C. Also, a temperature difference $\Delta T2$ between the geometric center formed by the adjacent bars 31 and an edge portion of the vacuum adiabatic body may be preferably provided to be less than 0.5° C. In the second plate member 20, a temperature difference between an average temperature of the second plate and a temperature at a point at which a heat transfer path passing through the conductive resistance sheet 60 or 63 meets the second plate may be largest. For example, when the second space is a region hotter than the first space, the temperature at the point at which the heat transfer path passing through the conductive resistance sheet meets the second plate member becomes lowest. Similarly, when the second space is a region colder than the first space, the temperature at the point at which the heat transfer path passing through the conductive resistance sheet meets the second plate member becomes highest.

This means that the amount of heat transferred through other points except the surface conduction heat passing through the conductive resistance sheet should be controlled, and the entire heat transfer amount satisfying the vacuum adiabatic body can be achieved only when the surface conduction heat occupies the largest heat transfer amount. To this end, a temperature variation of the conductive resistance sheet may be controlled to be larger than that of the plate member.

Physical characteristics of the parts constituting the vacuum adiabatic body will be described. In the vacuum adiabatic body, a force by vacuum pressure is applied to all of the parts. Therefore, a material having a strength (N/m2) of a certain level may be preferably used.

Under such circumferences, the plate members 10 and 20 and the side frame 70 may be preferably made of a material having a sufficient strength with which they are not damaged by even vacuum pressure. For example, when the number of bars 31 is decreased so as to limit the support conduction heat, deformation of the plate member occurs due to the vacuum pressure, which may be a bad influence on the external appearance of refrigerator. The radiation resistance sheet 32 may be preferably made of a material that has a low emissivity and can be easily subjected to thin film processing. Also, the radiation resistance sheet 32 is to ensure a strength high enough not to be deformed by an external impact. The supporting unit 30 is provided with a strength high enough to support the force by the vacuum pressure and endure an external impact, and is to have machinability. The conductive resistance sheet 60 may be preferably made of a material that has a thin plate shape and can endure the vacuum pressure.

In an embodiment, the plate member, the side frame, and the conductive resistance sheet may be made of stainless materials having the same strength. The radiation resistance sheet may be made of aluminum having a weaker strength that the stainless materials. The supporting unit may be made of resin having a weaker strength than the aluminum.

Unlike the strength from the point of view of materials, analysis from the point of view of stiffness is required. The stiffness (N/m) is a property that would not be easily deformed. Although the same material is used, its stiffness may be changed depending on its shape. The conductive resistance sheets 60 or 63 may be made of a material having a prescribed strength, but the stiffness of the material is preferably low so as to increase heat resistance and minimize radiation heat as the conductive resistance sheet is uniformly spread without any roughness when the vacuum pressure is applied. The radiation resistance sheet 32 requires a stiffness of a certain level so as not to contact another part due to deformation. Particularly, an edge portion of the radiation resistance sheet may generate conduction heat due to drooping caused by the self-load of the radiation resistance sheet. Therefore, a stiffness of a certain level is required. The supporting unit 30 requires a stiffness high enough to endure a compressive stress from the plate member and an external impact.

In an embodiment, the plate member and the side frame may preferably have the highest stiffness so as to prevent deformation caused by the vacuum pressure. The supporting unit, particularly, the bar may preferably have the second highest stiffness. The radiation resistance sheet may preferably have a stiffness that is lower than that of the supporting unit but higher than that of the conductive resistance sheet. The conductive resistance sheet may be preferably made of a material that is easily deformed by the vacuum pressure and has the lowest stiffness.

Even when the porous material 33 is filled in the vacuum space part 50, the conductive resistance sheet may preferably have the lowest stiffness, and the plate member and the side frame may preferably have the highest stiffness.

FIG. 5 is a view illustrating in detail a vacuum adiabatic body according to an embodiment. FIG. 5 shows a view of a distal end region of the vacuum space including a side part of the second plate member. The embodiment proposed in FIG. 5 may be preferably applied to the door-side vacuum adiabatic body, and the description of the vacuum adiabatic body shown in FIG. 4b among the vacuum adiabatic bodies shown in FIG. 4 may be applied to portions to which specific descriptions are not provided.

Referring to FIG. 5, the vacuum adiabatic body may include a first plate member 10, a second plate member 20, a conductive resistance sheet 60, and a side frame 70, which are parts that enable a vacuum space part 50 to be separated from an external atmospheric space.

The side frame 70 is formed in a bent shape, and may be provided such that the height of the side frame 70 is lowered at an outer portion, i.e., an edge portion or distal end portion when viewed from the entire shape of the vacuum adiabatic body. The side frame 70 may be provided in a shape in which a gap part between the side frame 70 and the second plate member 20 is divided into a portion having a high height h1 and a portion having a low height h2.

According to the above-described shape, the portion having the low height in the side frame 70 can secure a predetermined space as compared with other portions outside the vacuum adiabatic body. An addition mounting part (or addition mounting portion or surface) 80 in which an addition such as an exhaust port 40 or a door hinge is mounted may be provided due to a height difference of the side frame 70. Accordingly, it is possible to maximally secure the internal volume of a product such as the refrigerator provided by the vacuum adiabatic body, to improve an adiabatic effect, and to sufficiently ensure functions of the product.

One end of the side frame 70 is fastened to the conductive resistance sheet 60 by a sealing part 61, and the other end of the side frame 70 is fastened to the second plate member 20 by an edge part 611 (or edge joint, seal). The edge part 611 may be provided as a welding part. The vacuum space part 50 extends up to the edge part 611, thereby improving an adiabatic effect.

The side frame 70 provides a path through which solid conduction heat passing through the conductive resistance sheet 60 passes. In the refrigerator, cold air (or coldness from contact with cold air, heat transfer) passing through the conductive resistance sheet 60 may be transferred to the edge part 611 that is a contact point between the side frame 70 and a side part (or side portion or second section) 202 of the second plate member 20. However, the cold air may not only be reduced by the conductive resistance sheet 60 but also sufficiently resist while flowing along the side frame 70. Nevertheless, although dew may be formed, the formed dew may not be visible from the exterior.

Specifically, the second plate member 20 includes a front part (or front portion or first section) 201 and the side part 202 bent with respect to the front part 201. However, the side part 202 is not exposed to the exterior. Thus, although dew may be formed on the side part 202, a user cannot observe the formed dew with the naked eye, thereby improving a user's emotion. In addition, when the edge part 611 is provided as a welding part, a welding line inevitably generated due to heating is not viewed from the exterior, thereby improving a user's sense of beauty. It can be easily assumed that the side part 202 forms an outer wall of the vacuum space part 50.

Although the edge part 611 is provided at a corner portion of the front part 201 adjacent to the side part 202 in addition to the side part 202, the edge part may not be observed by the user. As another example, the edge part 611 may be provided to an edge portion of the second plate member 20, to enhance convenience of manufacturing while not being observed with the naked eye.

The formation of dew can be easily understood through a dew forming region (or joint, contact point) 71 generated due to a decrease in temperature at a contact portion of the side frame 70 with the front part 201 in a comparative example proposed in FIG. 11.

In the refrigerator, the cold air passing through the conductive resistance sheet 60 is transferred to the side frame 70, and hence the side frame 70 has a relatively higher temperature than the first plate member 10. Thus, when assuming that the entire region of the second plate member 20 contacting the other ends of first and second bars 311 and 312 has the same temperature, a temperature of the side frame 70 contacting one end of the second bar 313 can be maintained higher than that of the first plate member 10 contacting one end of the first bar 311. Accordingly, although lengths of the first and second bars 311 and 313 are different from each other, heat conduction through the first bar 311 can be maintained equally to that through the second bar 313. According to an experiment, it has been found that a second vacuum space part (or second vacuum space) 502 having a height of 1 to 2 mm can obtain a sufficient adiabatic effect equal to that of a first vacuum space part (or first vacuum space) 501 having a height of 10 to 20 mm.

The vacuum space part 50 includes the first vacuum space part 501 of which height is h1 and the second vacuum space part 502 of which height is h2 smaller than h1. The first and second vacuum space parts 501 and 502 can communicate with each other in a vacuum state. Accordingly, it is possible to reduce inconvenience of a manufacturing process in which a vacuum space part is separately formed.

A second support plate 352 may be provided to extend inside the second vacuum space part 502. In addition, the second bar 312 having a lower height than the first bar 311 may be provided to the second support plate 352. Thus, the gap of the second vacuum space part 502 can be maintained by the second bar 312. The second bar 312 may be provided as a single body with the second support plate 352. Since the heights of the first and second vacuum space parts 501 and 502 are different from each other, a first support plate 351 may not extend to the second vacuum space part 502. However, the present disclosure is not limited thereto, and the first support plate 351 may extend to the second vacuum space part 502. Although the first support plate 351 does not extend to the second vacuum space part 502, the flow of heat conducted from the first plate member 10 to the side frame 70 is resisted by the conductive resistance sheet 60, and thus conduction heat through the second bar 312 can obtain an equal effect of heat resistance as compared with heat conduction through the first bar 311.

As already described above, the conductive resistance sheet 60 has one purpose to resist heat transfer from the first plate member 10. Therefore, a rapid change in temperature occurs in the conductive resistance sheet 60 along the direction of the heat transfer. It has been described that the shielding part (or shield) 62 is provided to block heat transferred to the outside of the vacuum adiabatic body, corresponding to the rapid change in temperature. As the vacuum space part 50 is provided, heat transferred to the inside of the vacuum adiabatic body through the conductive resistance sheet 60 can obtain an adiabatic effect with respect to convection and solid conduction heat, but is weak against heat transfer caused by radiation and gas conduction. In order to solve such a problem, a radiation resistance sheet 32 may be placed even under a lower side of the conductive resistance sheet 60.

Specifically, the radiation resistance sheet 32 may include first, second, and third radiation resistance sheets 321, 322, and 323 sequentially provided in a direction toward the second support plate 352 from the first support plate 351. The first radiation resistance sheet 321 may extend up to the lower side of the conductive resistance sheet 60 by passing through an end portion of the first support plate 351. The second radiation resistance sheet 322 may extend outward by w2 as compared with the first radiation resistance sheet 321. The third radiation resistance sheet 323 may extend outward by w1 as compared with the second radiation resistance sheet 322.

According to such a configuration, the radiation resistance sheet 32 provided as a thin plate may be deformed by an external impact and load. This is because, if any deformed radiation resistance sheet contacts another adjacent radiation resistance sheet or the conductive resistance sheet 60, direct heat conduction occurs, and therefore, a large amount of adiabatic loss occurs. Therefore, the first radiation resistance sheet 321 may extend not to reach the center of the conductive resistance sheet 60 even when a predetermined deformation occurs in the first radiation resistance sheet 321. Since it is less likely that the second radiation resistance sheet 322 will contact the conductive resistance sheet 60, the second radiation resistance sheet 322 may extend further outward by passing through the center of the conductive resistance sheet 60. However, since it is likely that the second radiation resistance sheet 322 will contact another adjacent radiation resistance sheet, a length of the second radiation resistance sheet 322 extending from the first bar 311 is preferably limited to 10 to 15 mm when the radiation resistance sheet is an aluminum sheet having a thickness of 0.3 to 0.4 mm. The third radiation resistance sheet 323 may extend outward by w1 as compared with the second radiation resistance sheet 322. This is because the third radiation resistance sheet 323 is supported by the second support plate 352.

In FIG. 5, it is illustrated that the radiation resistance sheet 32 does not extend inside the second vacuum space part 502. However, the present disclosure is not limited thereto, and the third radiation resistance sheet 323 of which at least one portion is provided to contact the second support plate 352 may extend up to the inside of the second vacuum space part 502, thereby reducing radiation conduction heat.

A mounting end part (or protrusion, tab) 101 is provided at a corner of the first plate member 10, and a rib 102 is provided in the supporting unit 30. As the mounting end part 101 is guided by the rib 102, the first plate member 10 and the supporting unit 30 can be placed at accurate positions, respectively. Thus, it is possible to improve fastening accuracy between parts.

FIG. 6 is a view a correlation between the supporting unit and the first plate member, which illustrates any one edge portion.

Referring to FIG. 6, there may be provided a structure in which the rib 102 provided to the second support plate 352 and the mounting end part 101 provided to the first plate member 10 contact each other. Thus, when the first plate member 10 is fastened to the supporting unit 30 or when the supporting unit 30 is fastened to the first plate member 10, a position between the first plate member 10 and the supporting unit 30 can be accurately placed. The mounting end part 101 and the rib 102 have structures corresponding to each other, and their sizes and numbers may be increased/decreased depending on sizes of the first plate member 10 and the supporting unit 30.

The second bar 312 having a lower height than the first bar 311 is provided at an edge portion of the second support plate 352 provided in grid shape. Thus, it is possible to maintain the gap of the second vacuum space part 502.

FIG. 7 is a view showing an experimental result obtained by comparing the vacuum adiabatic body provided in FIG. 5 and the vacuum adiabatic body provided in FIG. 11.

Referring to FIG. 7, when the vacuum adiabatic bodies were used for the door of the refrigerator, and the refrigerator performed a standard operation, temperatures at edge portions of the vacuum adiabatic bodies were measured. As a result obtained by performing an experiment, when typical foaming urethane is used, a temperature at a top side Top of the vacuum adiabatic body was 2.2 0.5° C., temperatures at both sides Mid having a middle height of the vacuum adiabatic body were 1.4 0.5° C., a temperature at a bottom side Bottom of the vacuum adiabatic body was 1.3 0.5° C., and a temperature at a center Center of the vacuum adiabatic body was 0.8 0.5° C. In the comparative example proposed in FIG. 11, a temperature at a top side Top of the vacuum adiabatic body was 1.0 0.5° C., temperatures at both sides Mid having a middle height of the vacuum adiabatic body were −0.3 0.5° C., a temperature at a bottom side Bottom of the vacuum adiabatic body was −0.5 0.5° C., and a temperature at a center Center of the vacuum adiabatic body was 1.3 0.5° C. According to the comparative example, dew may be formed at the top side Top, both the sides Middle having the middle height, and the bottom side Bottom. Particularly, it can be seen that dew may be formed at both the sides Middle having the middle height and the bottom side Bottom in a condition that an external air temperature is 25 0.5° C. and a relative humidity is 87% due to a low temperature below zero.

On the other hand, in the embodiment, a temperature at a top side Top of the vacuum adiabatic body was 2.4 0.5° C., temperatures at both sides Mid having a middle height of the vacuum adiabatic body were 1.3 0.5° C., a temperature at a bottom side Bottom of the vacuum adiabatic body was 1.2 0.5° C., and a temperature at a center Center of the vacuum adiabatic body was 1.3 0.5° C. According to the embodiment, it is possible to obtain a better effect as compared with when the typical foaming urethane is used, and it can be seen that the formation of dew on a front surface of the door is prevented.

Hereinafter, a vacuum pressure preferably determined depending on an internal state of the vacuum adiabatic body. As already described above, a vacuum pressure is to be maintained inside the vacuum adiabatic body so as to reduce heat transfer. At this time, it will be easily expected that the vacuum pressure is preferably maintained as low as possible so as to reduce the heat transfer.

The vacuum space part may resist the heat transfer by applying only the supporting unit 30. Alternatively, the porous material 33 may be filled together with the supporting unit in the vacuum space part 50 to resist the heat transfer. Alternatively, the vacuum space part may resist the heat transfer not by applying the supporting unit but by applying the porous material 33.

The case where only the supporting unit is applied will be described.

FIG. 8 illustrates graphs showing changes in adiabatic performance and changes in gas conductivity with respect to vacuum pressures by applying a simulation.

Referring to FIG. 8, it can be seen that, as the vacuum pressure is decreased, i.e., as the vacuum degree is increased, a heat load in the case of only the main body (Graph 1) or in the case where the main body and the door are joined together (Graph 2) is decreased as compared with that in the case of the typical product formed by foaming polyurethane, thereby improving the adiabatic performance. However, it can be seen that the degree of improvement of the adiabatic performance is gradually lowered. Also, it can be seen that, as the vacuum pressure is decreased, the gas conductivity (Graph 3) is decreased. However, it can be seen that, although the vacuum pressure is decreased, the ratio at which the adiabatic performance and the gas conductivity are improved is gradually lowered. Therefore, it is preferable that the vacuum pressure is decreased as low as possible. However, it takes long time to obtain excessive vacuum pressure, and much cost is consumed due to excessive use of a getter. In the embodiment, an optimal vacuum pressure is proposed from the above-described point of view.

FIG. 9 illustrates graphs obtained by observing, over time and pressure, a process of exhausting the interior of the vacuum adiabatic body when the supporting unit is used.

Referring to FIG. 9, in order to create the vacuum space part 50 to be in the vacuum state, a gas in the vacuum space part 50 is exhausted by a vacuum pump while evaporating a latent gas remaining in the parts of the vacuum space part 50 through baking. However, if the vacuum pressure reaches a certain level or more, there exists a point at which the level of the vacuum pressure is not increased any more ($\Delta t1$). After that, the getter is activated by disconnecting the vacuum space part 50 from the vacuum pump and applying heat to the vacuum space part 50 ($\Delta t2$). If the getter is activated, the pressure in the vacuum space part 50 is decreased for a certain period of time, but then normalized to maintain a vacuum pressure of a certain level. The vacuum pressure that maintains the certain level after the activation of the getter is approximately $1.8 \times 10-6$ Torr.

In the embodiment, a point at which the vacuum pressure is not substantially decreased any more even though the gas is exhausted by operating the vacuum pump is set to the lowest limit of the vacuum pressure used in the vacuum adiabatic body, thereby setting the minimum internal pressure of the vacuum space part 50 to $1.8 \times 10-6$ Torr.

FIG. 10 illustrates graphs obtained by comparing vacuum pressures and gas conductivities.

Referring to FIG. 10, gas conductivities with respect to vacuum pressures depending on sizes of a gap in the vacuum space part 50 are represented as graphs of effective heat transfer coefficients (eK). Effective heat transfer coefficients (eK) were measured when the gap in the vacuum space part 50 has three sizes of 2.76 mm, 6.5 mm, and 12.5 mm. The gap in the vacuum space part 50 is defined as follows. When the radiation resistance sheet 32 exists inside vacuum space part 50, the gap is a distance between the radiation resistance sheet 32 and the plate member adjacent thereto. When the radiation resistance sheet 32 does not exist inside vacuum space part 50, the gap is a distance between the first and second plate members.

It can be seen that, since the size of the gap is small at a point corresponding to a typical effective heat transfer coefficient of 0.0196 W/mK, which is provided to a adiabatic material formed by foaming polyurethane, the vacuum pressure is $2.65 \times 10-1$ Torr even when the size of the gap is 2.76 mm. Meanwhile, it can be seen that the point at which reduction in adiabatic effect caused by gas conduction heat is saturated even though the vacuum pressure is decreased is a point at which the vacuum pressure is approximately $4.5 \times 10^{-3}$ Torr. The vacuum pressure of $4.5 \times 10^{-3}$ Torr can be defined as the point at which the reduction in adiabatic effect caused by gas conduction heat is saturated. Also, when the effective heat transfer coefficient is 0.1 W/mK, the vacuum pressure is $1.2 \times 10^{-2}$ Torr.

When the vacuum space part 50 is not provided with the supporting unit but provided with the porous material, the size of the gap ranges from a few micrometers to a few hundreds of micrometers. In this case, the amount of radiation heat transfer is small due to the porous material even when the vacuum pressure is relatively high, i.e., when the vacuum degree is low. Therefore, an appropriate vacuum pump is used to adjust the vacuum pressure. The vacuum pressure appropriate to the corresponding vacuum pump is approximately $2.0 \times 10^{-4}$ Torr. Also, the vacuum pressure at the point at which the reduction in adiabatic effect caused by gas conduction heat is saturated is approximately $4.7 \times 10^{-2}$ Torr. Also, the pressure where the reduction in adiabatic effect caused by gas conduction heat reaches the typical effective heat transfer coefficient of 0.0196 W/mK is 730 Torr.

When the supporting unit and the porous material are provided together in the vacuum space part, a vacuum pressure may be created and used, which is middle between the vacuum pressure when only the supporting unit is used and the vacuum pressure when only the porous material is used.

In the description of the present disclosure, a part for performing the same action in each embodiment of the vacuum adiabatic body may be applied to another embodiment by properly changing the shape or dimension of the other embodiment. Accordingly, still another embodiment can be easily proposed. For example, in the detailed description, in the case of a vacuum adiabatic body suitable as a door-side vacuum adiabatic body, the vacuum adiabatic body may be applied as a main body-side vacuum adiabatic body by properly changing the shape and configuration of a vacuum adiabatic body.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The vacuum adiabatic body proposed in the present disclosure may be preferably applied to refrigerators. However, the application of the vacuum adiabatic body is not limited to the refrigerators, and may be applied in various apparatuses such as cryogenic refrigerating apparatuses, heating apparatuses, and ventilation apparatuses.

According to the present disclosure, the vacuum adiabatic body can be industrially applied to various adiabatic apparatuses. The adiabatic effect can be enhanced, so that it is possible to improve energy use efficiency and to increase the effective volume of an apparatus.

However, it is difficult to obtain an adiabatic effect of a practical level by providing the walls of the refrigerator to be in a sufficient vacuum state. Specifically, it is difficult to prevent heat transfer at a contact portion between external and internal cases having different temperatures. Further, it is difficult to maintain a stable vacuum state. Furthermore, it is difficult to prevent deformation of the cases due to a sound pressure in the vacuum state. Due to these problems, the technique of Reference Document 3 is limited to cryogenic refrigerating apparatuses, and is not applied to refrigerating apparatuses used in general households.

Embodiments provide a vacuum adiabatic body and a refrigerator, which can obtain a sufficient adiabatic effect in a vacuum state and be applied commercially.

In one embodiment, a vacuum adiabatic body includes: a first plate member defining at least one portion of a wall for a first space; a second plate member defining at least one portion of a wall for a second space having a different temperature from the first space; a sealing part sealing the first plate member and the second plate member to provide a third space that has a temperature between the temperature of the first space and the temperature of the second space and is in a vacuum state; a supporting unit maintaining the third space; a heat resistance unit for decreasing a heat transfer amount between the first plate member and the second plate member; and an exhaust port through which a gas in the third space is exhausted, wherein the heat resistance unit includes a conductive resistance sheet capable of resisting heat conduction flowing along a wall for the third space, and a side frame fastened to the conductive resistance sheet to define at least one portion of the wall for the third space.

The side frame may extend in a direction of an end portion of the vacuum adiabatic body. The side frame may be fastened to each of the first and second plate members at an edge portion of the vacuum adiabatic body. The side frame may be sealed with the conductive resistance sheet. The side frame may be provided in a bent shape. The supporting unit may include: at least one support plate capable of extending in a horizontal direction with respect to the first plate member and the second plate member; and at least one bar provided to the support plate to be interposed between the first plate member and the second plate member. The bar may contact the side frame. The support plate may have a plate shape or a grid shape. The vacuum adiabatic body may include at least two radiation resistance sheets provided in a plate shape inside the third space. At least one of the radiation resistance sheets may extend down to a lower side of the conductive resistance sheet. The radiation resistance sheet may further extend outward as it reaches from the first plate member to the second plate member.

In another embodiment, a vacuum adiabatic body includes: a first plate member defining at least one portion of a wall for a first space; a second plate member defining at least one portion of a wall for a second space having a different temperature from the first space; a sealing part sealing the first plate member and the second plate member to provide a third space that has a temperature between the temperature of the first space and the temperature of the second space and is in a vacuum state; a supporting unit maintaining the third space; a heat resistance unit for decreasing a heat transfer amount between the first plate member and the second plate member; and an exhaust port through which a gas in the third space is exhausted, wherein the heat resistance unit includes a conductive resistance sheet capable of resisting heat conduction flowing along a wall for the third space, and a side frame fastened to the conductive resistance sheet, and wherein the heat resistance unit includes at least one radiation resistance sheet provided in a plate shape inside the third space or includes a porous material to resist radiation heat transfer between the second plate member and the first plate member inside the third space.

One surface of the conductive resistance sheet may be heat-insulated by the third space, and another surface of the conductive resistance sheet may be shielded by a shielding part. The conductive resistance sheet may have a lower stiffness than each of the first and second plate members, the radiation resistance sheet, and the supporting unit. The conductive resistance sheet may define, together with each of the first and second plate members, at least one portion of the wall for the third space.

In still another embodiment, a refrigerator includes: a main body provided with an internal space in which storage goods are stored; and a door provided to open/close the main body from an external space, wherein, in order to supply a refrigerant into the main body, the refrigerator includes: a compressor for compressing the refrigerant; a condenser for condensing the compressed refrigerant; an expander for expanding the condensed refrigerant; and an evaporator for evaporating the expanded refrigerant to take heat, wherein at least one of the main body and the door includes a vacuum adiabatic body, wherein the vacuum adiabatic body includes: a first plate member defining at least one portion of a wall for the internal space; a second plate member defining at least one portion of a wall for the external space; a sealing part sealing the first plate member and the second plate member to provide a vacuum space part that has a temperature between a temperature of the internal space and a temperature of the external space and is in a vacuum state; a supporting unit maintaining the vacuum space part; a heat resistance unit for decreasing a heat transfer amount between the first plate member and the second plate member; and an exhaust port through which a gas in the vacuum space part is exhausted, wherein the heat resistance unit includes a conductive resistance sheet capable of resisting heat conduction flowing along a wall for the vacuum space part, and a side frame fastened to the conductive resistance sheet.

The side frame may extend up to an outermost side of the vacuum adiabatic body. The side frame may be fastened to an edge portion of the second plate member. The side frame may define at least one partial outer wall for the vacuum space part. The heat resistance unit may include at least one radiation resistance sheet provided in a plate shape inside the vacuum space part or may include a porous material to resist radiation heat transfer between the second plate member and the first plate member inside the vacuum space part.

According to the present disclosure, it is possible to obtain a sufficient and stable vacuum adiabatic effect. According to the present disclosure, it is possible to prevent the formation of dew on an outer surface of the vacuum adiabatic body, which may occur in a severe situation, by controlling the flow of heat. According to the present disclosure, it is possible to provide a structurally stable vacuum adiabatic body.

The details of one or more embodiments are set forth in the accompanying drawings and the description below. Other features will be apparent from the description and drawings, and from the claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A vacuum adiabatic body comprising:
   a first plate to define a first portion of a wall;
   a second plate to define a second portion of the wall;
   a side frame to define another portion of the wall for an inner space, the another portion of the wall including a wall extending in a first direction corresponding to a height of the inner space,
   wherein the side frame includes a first portion, a second portion and a third portion, the first portion of the side frame is spaced apart from the second portion of the side frame, and the third portion is disposed between the first portion of the side frame and the second portion of the side frame,
   wherein each of the first plate, the second plate and the side frame are secured to form the inner space which is configured to be in a vacuum state,
   wherein the vacuum adiabatic body provides a heat transfer path between the first plate and the second plate by passing along the side frame,
   wherein the second portion of the side frame extends from a main portion of the vacuum adiabatic body toward a side portion of the vacuum adiabatic body,
   wherein the first portion of the side frame and the third portion of the side frame contact with the inner space such that the first portion of the side frame and the third portion of the side frame are thermally insulated by the inner space,
   wherein one end of the second portion of the side frame is spaced apart from an edge portion of the second plate in a second direction that extends from the main portion of the vacuum adiabatic body toward the side portion of the vacuum adiabatic body, and a space is provided between the one end of the second portion of the side frame and the edge portion of the second plate in the second direction that extends from the main portion of the vacuum adiabatic body toward the side portion of the vacuum adiabatic body, such that the heat transfer via the side frame toward the side portion of the vacuum adiabatic body can be reduce,
   wherein the first portion of the side frame is spaced apart from a front portion of the vacuum adiabatic body, and the second portion of the side frame contacts the front portion of the vacuum adiabatic body, and
   wherein the first portion of the side frame and the second portion of the side frame extend in opposite directions from both ends of the third portion of the side frame, respectively.

2. The vacuum adiabatic body according to claim 1, wherein the second plate includes a front part disposed at a front surface of the vacuum adiabatic body and a side part disposed at the side portion of the vacuum adiabatic body, and the side frame contacts the side part via an edge part, and wherein the side frame defines at least a portion of the wall adjacent the inner space.

3. The vacuum adiabatic body according to claim 1, wherein the third portion of the side frame has a portion extending in the first direction corresponding to the height of the inner space.

4. The vacuum adiabatic body according to claim 1, wherein the first portion of the side frame is spaced apart from the side portion of the vacuum adiabatic body, and the second portion of the side frame is spaced apart from the side portion of the vacuum adiabatic body.

5. A vacuum adiabatic body comprising:
a first plate to define a first portion of a wall;
a second plate to define a second portion of the wall; and
a side frame to define another portion of the wall for an inner space, the another portion of the wall including a wall extending in a first direction corresponding to a height of the inner space,
wherein each of the first plate, the second plate and the side frame are secured to form the inner space which is configured to be in a vacuum state,
wherein the vacuum adiabatic body provides a heat transfer path between the first plate and the second plate by passing along the side frame,
wherein the side frame has a portion extending in the first direction corresponding to the height of the inner space,
wherein the portion of the side frame has one surface that contacts with the inner space such that the one surface of the side frame is thermally insulated by the inner space, and
wherein the portion of the side frame is spaced apart from an edge portion of the second plate in a second direction that extends from a main portion of the vacuum adiabatic body toward a side portion of the vacuum adiabatic body, and a space is provided between the portion of the side frame and the edge portion of the second plate in the second direction that extends from the main portion of the vacuum adiabatic body toward the side portion of the vacuum adiabatic body, such that the heat transfer via the side frame toward the side portion of the vacuum adiabatic body can be reduced,
wherein the side frame has a thickness smaller than a thickness of the first plate and the second plate, and
wherein the side frame is made of stainless materials.

6. The vacuum adiabatic body according to claim 5, wherein the portion of the side frame contacts with another portion of the side frame, the another portion of the side frame extending from the main portion of the vacuum adiabatic body toward the side portion of the vacuum adiabatic body.

7. The vacuum adiabatic body according to claim 5, comprising a conductive resistance sheet disposed between the portion of the side frame and the first plate.

8. A vacuum adiabatic body comprising:
a first plate to define a first portion of a wall;
a second plate to define a second portion of the wall;
a side frame to define another portion of the wall for an inner space, the another portion of the wall including a wall extending in a direction of a height of the inner space; and
a conductive resistance sheet provided to prevent heat conduction between the first plate and the second plate and connected to at least one of the first and second plate, the conductive resistance sheet having a smaller thickness than the first plate, or a heat conduction distance of the conductive resistance sheet being provided longer than a linear distance of the first and the second plate,
wherein the vacuum adiabatic body provides a heat transfer path between the first plate and the second plate by passing along the side frame,
wherein the side frame has a portion spaced apart from a side portion of the vacuum adiabatic body, such that the heat transfer via the side frame toward the side portion of the vacuum adiabatic body can be reduced, and
wherein the conductive resistance sheet does not contact with the side portion of the vacuum adiabatic body,
wherein the conduction resistance sheet has a first end connected to the side frame and a second end connected to the first plate.

9. The vacuum adiabatic body according to claim 8, wherein one surface of the conductive resistance sheet is thermally insulated by the inner space, and wherein the conductive resistance sheet and the first and the second plates are made of a same material.

10. The vacuum adiabatic body according to claim 8, wherein the conductive resistance sheet is spaced apart from the side portion of the vacuum adiabatic body.

11. The vacuum adiabatic body according to claim 8, wherein the side frame is provided outside of the conductive resistance sheet.

12. A vacuum adiabatic body comprising:
a first plate to define a first portion of a wall;
a second plate to define a second portion of the wall;
a side frame to define another portion of the wall for an inner space, the another portion of the wall including a wall extending in a first direction corresponding to a height of the inner space; and
a support configured to maintain a distance between the first plate and the second plate, the support being disposed next to at least one of the first plate and the second plate,
wherein the support includes;
at least one support plate that extends laterally along the first plate and the second plate and provided in a lattice shape such that an area where the support plate contacts the first or second plate is decreased,
at least one first bar extending between the first plate and the second plate in the first direction to maintain a gap in the inner space, and
at least one second bar provided on the support plate, the at least one second bar to extend between the side frame and the second plate,
wherein the vacuum adiabatic body provides a heat transfer path between the first plate and the second plate by passing along the side frame,
wherein the side frame has a portion spaced apart from a side portion of the vacuum adiabatic body, such that the heat transfer via the side frame toward the side portion of the vacuum adiabatic body can be reduced, and
wherein one or more of the at least one second bar contacts the side frame.

13. The vacuum adiabatic body according to claim 12, wherein when at least one of the support plate, the at least one first bar and the at least one second bar is disposed in the inner space, $1.8 \times 10^{(-6)}$ Torr $< V \leq 2.65 \times 10^{(-1)}$ Torr, V being defined a vacuum pressure in the inner space.

14. The vacuum adiabatic body according to claim 13, wherein $4.5 \times 10^{(-3)}$ Torr $< V \leq 2.65 \times 10^{(-1)}$ Torr.

15. The vacuum adiabatic body according to claim 14, wherein $1.2 \times 10^{(-2)}$ Torr $\leq V \leq 2.65 \times 10^{(-1)}$ Torr.

16. The vacuum adiabatic body according to claim 12, wherein a gas in the inner space is exhausted by a vacuum pump while the inner space being baked during Δt1 and the gas in the inner space is absorbed by a getter while the inner space being baked during Δt2, the Δt1 is larger than the Δt2.

17. The vacuum adiabatic body according to claim 16, wherein a minimum of a vacuum pressure in the inner space during the Δt2 is smaller than a minimum of a vacuum pressure in the inner space during the Δt1.

18. The vacuum adiabatic body according to claim 16, wherein a maximum of a vacuum pressure in the inner space during the Δt2 is smaller than a maximum of a vacuum pressure in the inner space during the Δt1.

19. The vacuum adiabatic body according to claim 12, wherein the support plate, the at least one first bar and the at least one second bar are placed into the inner space together.

20. A vacuum adiabatic body comprising:
a first plate to define a first portion of a wall;
a second plate to define a second portion of the wall;
a side frame to define another portion of the wall for an inner space, the another portion of the wall including a wall extending in a first direction corresponding to a height of the inner space;
a support configured to maintain a distance between the first plate and the second plate, the support being disposed next to at least one of the first plate and the second plate,
wherein the support includes at least one first bar extending between the first plate and the second plate to maintain a gap in the inner space, and at least one second bar extending between the second plate and the side frame to maintain a gap in the inner space, the at least one second bar supporting the side frame, and
wherein the support includes a support plate provided to at least one end of the at least one second bar,
wherein a first end of the side frame is disposed at a same height (h1) as the first plate, and a second end of the side frame is disposed at a different height (h2) than the first plate, and
wherein the at least one second bar is disposed between the second plate and the second end of the side frame, and has the height of h2.

21. A vacuum adiabatic body comprising:
a first plate to define a first portion of a wall;
a second plate to define a second portion of the wall;
a side frame to define another portion of the wall for an inner space, the another portion of the wall including a wall extending in a first direction corresponding to a height of the inner space; and
a support configured to maintain a distance between the first plate and the second plate, the support being disposed next to at least one of the first plate and the second plate,
wherein the support includes at least one of a bar extending in the first direction and a support plate extending in a second direction corresponding to a width of the inner space,
wherein the vacuum adiabatic body provides a heat transfer path between the first plate and the second plate by passing along the side frame,
wherein the side frame has a portion spaced apart from a side portion of the vacuum adiabatic body, such that the heat transfer via the side frame toward the side portion of the vacuum adiabatic body can be reduced, and wherein a material of the support includes a resin or a material selected from the group consisting of glass fiber PC, low outgas sing PC, PPS, and LCP,
wherein the first plate, the second plate, and the side frame are made of stainless materials having a same strength, and
wherein the side frame has a higher stiffness than the support.

22. A vacuum adiabatic body comprising:
a first plate to define a first portion of a wall;
a second plate to define a second portion of the wall, the second plate having a different temperature from the first plate;
a side frame to define another portion of the wall for an inner space, the another portion of the wall including a wall extending in a first direction corresponding to a height of the inner space; and
a support configured to maintain a distance between the first plate and the second plate, the support being disposed next to at least one of the first plate and the second plate,
wherein the support includes at least one of a bar extending in the first direction corresponding to the height of the inner space and a support plate extending in a second direction corresponding to a width of the inner space,
wherein the vacuum adiabatic body provides a heat transfer path between the first plate and the second plate by passing along the side frame,
wherein the side frame has a portion spaced apart from a side portion of the vacuum adiabatic body, such that the heat transfer via the side frame toward the side portion of the vacuum adiabatic body can be reduced,
wherein the support includes adjacent bars, a temperature difference ΔT1 between a geometric center formed by the adjacent bars and a point at which each of the adjacent bars is located being provided to be less than 0.5° C.
wherein the adjacent bars include at least one first bar extending between the first plate and the second plate to maintain a gap in the inner space, and at least one second bar extending between the second plate and the side frame to maintain a gap in the inner space, the at least one second bar supporting the side frame, and
wherein the side frame that contacts one end of the at least one second bar has a higher temperature than the first plate that contacts one end of the at least one first bar.

23. A vacuum adiabatic body comprising:
a first plate to define a first portion of a wall;
a second plate to define a second portion of the wall, the second plate having a different temperature from the first plate;
a side frame to define another portion of the wall for an inner space, the another portion of the wall including a wall extending in a first direction corresponding to a height of the inner space; and
a support configured to maintain a distance between the first plate and the second plate, the support being disposed next to at least one of the first plate and the second plate,
wherein the support includes at least one of a bar extending in the first direction and a support plate extending in a second direction corresponding to a width of the inner space,
wherein the vacuum adiabatic body provides a heat transfer path between the first plate and the second plate by passing along the side frame, wherein the side frame has a portion spaced apart from a side portion of the vacuum adiabatic body, such that the heat transfer via the side frame toward the side portion of the vacuum adiabatic body can be reduced, wherein the support includes adjacent bars, wherein a temperature difference ΔT2 between the geometric center formed by the adjacent bars and an edge portion of the vacuum adiabatic body being provided to be less than 0.5° C., wherein the adjacent bars include at least one first bar extending between the first plate and the second plate to maintain a gap in the inner space, and at least one second bar extending between the second plate and the side frame to maintain a gap in the inner space, and the at least one second bar supporting the side frame, and wherein the side frame that contacts one end of the at least one second bar has a higher temperature than the first plate that contacts one end of the at least one first bar.

24. A vacuum adiabatic body comprising:

a first plate to define a first portion of a wall;

a second plate to define a second portion of the wall;

a side frame to define another portion of the wall for an inner space, the another portion of the wall including a wall extending in a first direction corresponding to a height of the inner space; and a support configured to maintain a distance between the first plate and the second plate, the support being disposed next to at least one of the first plate and the second plate, wherein the support includes at least one of a bar extending in the first direction and a support plate extending in a second direction corresponding to a width of the inner space, wherein the vacuum adiabatic body provides a heat transfer path between the first plate and the second plate by passing along the side frame, wherein the side frame has a portion spaced apart from a side portion of the vacuum adiabatic body, such that the heat transfer via the side frame toward the side portion of the vacuum adiabatic body can be reduced, and wherein when at least one of the support plate and the bar is disposed in the inner space, $1.0 \times 10^{-3}$ Torr $< V \leq 2.65 \times 10^{-1}$ Torr, V being defined a vacuum pressure in the inner space, wherein the side frame has a prescribed bent shape in which at least two sections are bent from another section, wherein the side frame has a surface that is in contact with a front portion of the vacuum adiabatic body, and wherein the portion of the side frame is provided at an edge of the surface of the side frame.

* * * * *